US012610389B2

(12) United States Patent
Park et al.

(10) Patent No.: US 12,610,389 B2
(45) Date of Patent: Apr. 21, 2026

(54) METHOD AND APPARATUS FOR CHANNEL INFORMATION TRANSFER IN COMMUNICATION SYSTEM

(71) Applicant: Electronics and Telecommunications Research Institute, Daejeon (KR)

(72) Inventors: Han Jun Park, Daejeon (KR); An Seok Lee, Daejeon (KR); Heesoo Lee, Daejeon (KR); Yong Jin Kwon, Daejeon (KR); Yu Ro Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 348 days.

(21) Appl. No.: 18/308,631

(22) Filed: Apr. 27, 2023

(65) Prior Publication Data

US 2023/0354395 A1     Nov. 2, 2023

(30) Foreign Application Priority Data

Apr. 27, 2022     (KR) ........................ 10-2022-0051967
Sep. 15, 2022     (KR) ........................ 10-2022-0116520
(Continued)

(51) Int. Cl.
H04W 72/541          (2023.01)
G06N 3/08            (2023.01)
(Continued)

(52) U.S. Cl.
CPC ............ H04W 72/541 (2023.01); G06N 3/08 (2013.01); H04L 5/0051 (2013.01); H04W 72/04 (2013.01)

(58) Field of Classification Search
CPC ...... H04W 72/541; H04W 72/04; G06N 3/08; G06N 3/0455; G06N 3/0464; G06N 3/084;
(Continued)

(56) References Cited

U.S. PATENT DOCUMENTS 10,911,113 B2     2/2021     Wen et al.
2018/0227928 A1     8/2018     Kim et al.
(Continued)

FOREIGN PATENT DOCUMENTS

CN          111464220          6/2021
WO          2020/192790          10/2020
(Continued)

OTHER PUBLICATIONS

Soltani et al., "Deep Learning-Based Channel Estimation", arXiv:1810. 05893v4 [cs.IT], Feb. 19, 2019, 3 total pages.
(Continued)

*Primary Examiner* — Sun Jong Kim
(74) *Attorney, Agent, or Firm* — KILE PARK REED & HOUTTEMAN PLLC

(57)          ABSTRACT

Disclosed are techniques for channel information transfer in a communication system. A method of a terminal may comprise: receiving, from a base station, first signal configuration information including transmission resource information of a first signal indicated for training; receiving, from the base station, at least one first signal according to the transmission resource information; and training an interference cancellation artificial neural network based on the at least one first signal.

11 Claims, 13 Drawing Sheets

(30) Foreign Application Priority Data

Nov. 28, 2022    (KR) ........................ 10-2022-0161998
Apr. 26, 2023    (KR) ........................ 10-2023-0054599

(51) Int. Cl.

*H04L 5/00*        (2006.01)
*H04W 72/04*      (2023.01)

(58) Field of Classification Search

CPC ... G06N 3/0895; H04L 5/0051; H04L 5/0048; H04L 2025/03464; H04L 1/08; H04L 1/1671; H04L 25/0226; H04L 25/0254

See application file for complete search history.

(56) References Cited

U.S. PATENT DOCUMENTS

| | | |
|---|---|---|
| 2022/0052814 A1* | 2/2022 | Yang ..................... H04L 5/0048 |
| 2022/0060917 A1 | 2/2022 | Vitthaladevuni et al. |
| 2022/0077993 A1 | 3/2022 | Hong et al. |
| 2022/0247467 A1* | 8/2022 | Huang .................. H04W 72/23 |
| 2023/0231689 A1* | 7/2023 | Elshafie ................ H04L 1/1671 |
| | | 370/329 |
| 2024/0106508 A1* | 3/2024 | Tang ..................... H04L 1/0029 |
| 2024/0357399 A1* | 10/2024 | Ren ...................... H04B 17/345 |
| 2025/0088232 A1* | 3/2025 | Hao .................... H04L 25/0254 |
| 2025/0088879 A1* | 3/2025 | Li ........................ H04B 17/364 |
| 2025/0247189 A1* | 7/2025 | Wang ..................... H04L 41/16 |

FOREIGN PATENT DOCUMENTS

| | | |
|---|---|---|
| WO | 2021/208061 | 10/2021 |
| WO | 2022/000365 | 1/2022 |

OTHER PUBLICATIONS

Batson et al., "Noise2Self: Blind Denoising by Self-Supervision", Proceedings of the 36 th International Conference on Machine Learning, Long Beach, California, PMLR 97, 2019.10 total pages.

Wen et al., "Deep Learning for Massive MIMO CSI Feedback", arXiv:1712.08919v4 [cs.IT], Apr. 23, 2018, Apr. 23, 2018, pp. 1-5.

Cui et al., "TransNet: Full Attention Network for CSI Feedback in FDD Massive MIMO System", DOI 10.1109/LWC.2022.3149416, IEEE Wireless Communications Letters, pp. 1-5.

"New SI: Study on Artificial Intelligence (AI)/Machine Learning (ML) for NR Air Interface", RP-213599, 3GPP TSG RAN, Dec. 2021, 6 total pages.

"Physical channels and modulation", 3GPP Technical Specification 38.211 V17.4.0, Dec. 2022, pp. 1-136.

"Multiplexing and channel coding", 3GPP Technical Specification 38.212 V17.5.0, Mar. 2023, pp. 1-203.

"Physical layer procedures for control", 3GPP Technical Specification 38.213 V17.5.0, Mar. 2023, pp. 1-261.

"Physical layer procedures for data", 3GPP Technical Specification 38.214 v17.5.0, Mar. 2023, pp. 1-231.

"Physical layer measurements", 3GPP Technical Specification 38.215 V17.3.0, Mar. 2023, pp. 1-26.

* cited by examiner reference signal density increases
in the frequency domain reference signal density increases
in the time domain ■ first reference signal
□ second reference signal terminal                                    base station subset transmission resource
configuration information                   ~S1010 second reference signal                     ~S1020 perform training    ~S1030

FIG. 13

FIG. 14 frequency-domain channel information operating bandwidth virtual bandwidth 1410 inverse Fourier transformer

Figure 14:
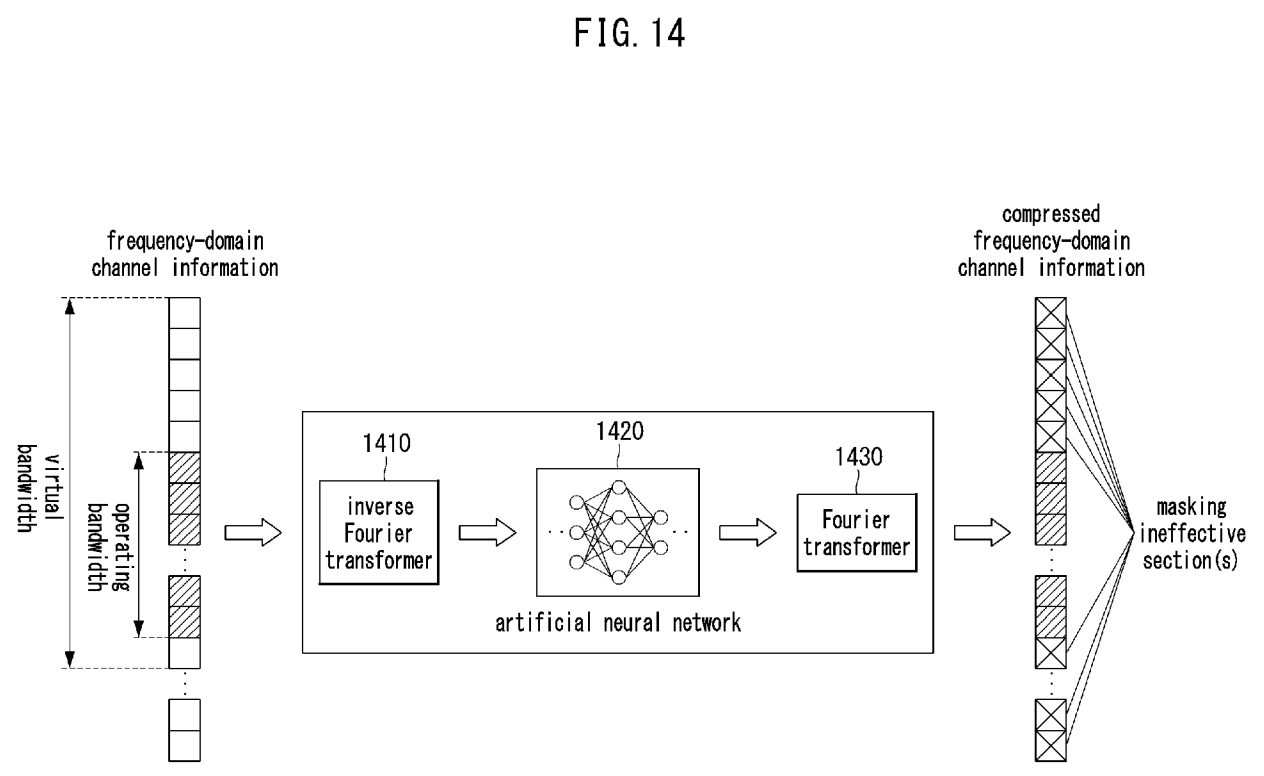

1420

1430 Fourier transformer artificial neural network compressed frequency-domain channel information masking ineffective section(s)

METHOD AND APPARATUS FOR CHANNEL INFORMATION TRANSFER IN COMMUNICATION SYSTEM

CROSS-REFERENCE TO RELATED APPLICATIONS

This application claims priority to Korean Patent Applications No. 10-2022-0051967, filed on Apr. 27, 2022, No. 10-2022-0116520, filed on Sep. 15, 2022, No. 10-2022-0161998, filed on Nov. 28, 2022, and No. 10-2023-0054599, filed on Apr. 26, 2023, with the Korean Intellectual Property Office (KIPO), the entire contents of which are hereby incorporated by reference.

BACKGROUND

1. Technical Field

Exemplary embodiments of the present disclosure relate to a technique for channel information transfer in a communication system, and more particularly, to a technique for channel information transfer in a communication system where channel information based on reference signals is transmitted to a base station by using neural networks.

2. Related Art

With the development of information and communication technology, various wireless communication technologies have been developed. Typical wireless communication technologies include long term evolution (LTE), new radio (NR), 6th generation (6G) communication, and/or the like. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, to improve the channel estimation performance, methods of utilizing advanced artificial intelligence (AI) and machine learning (ML) technologies in the next-generation wireless transmission technology are being currently considered. In relation to these efforts, an artificial neural network technique to which a denoising convolutional neural networks (DnCNN) model is applied to remove interference and/or noise on a channel is being researched. In addition, artificial neural network techniques for obtaining a compressed latent expression for a multiple input multiple output (MIMO) channel using an auto-encoder, which is one of recent deep learning techniques, are being studied. In order to use such a DnCNN or auto-encoder in a base station and a terminal, it is required to improve a training method of the DnCNN or auto-encoder, and the measurement performance may also need to be improved.

SUMMARY

Exemplary embodiments of the present disclosure are directed to providing a method and an apparatus for channel information transfer in a communication system where channel information is transmitted to a base station by using artificial neural networks trained based on reference signals for training.

According to a first exemplary embodiment of the present disclosure, a method of a terminal may comprise: receiving, from a base station, first signal configuration information including transmission resource information of a first signal indicated for training; receiving, from the base station, at least one first signal according to the transmission resource information; and training an interference cancellation artificial neural network based on the at least one first signal.

The method may further comprise: before the receiving of the first signal configuration information, generating capability information including at least one of information indicating whether the terminal is capable of training the interference cancellation artificial neural network using the first signal, information indicating whether the terminal uses the first signal, information indicating whether the terminal needs the first signal, information on a transmission periodicity of the first signal, or information on a transmission resource of the first signal; and transmitting the capability information to the base station, wherein the transmission resource information is configured based on the capability information.

In the transmission resource information, time information may be configured in one of a scheme of configuring a start offset and a transmission periodicity, a scheme of configuring a transmission start time and a transmission end time, or a scheme of configuring a specific time.

The first signal configuration information may be received through a higher layer signal or a dynamic control signal of the base station.

The method may further comprise: transmitting a hybrid automatic repeat and request-acknowledgment (HARQ-ACK) indicating a first signal request to the base station, wherein the at least one first signal is received in response to the first signal request.

The method may further comprise: transmitting a channel state information feedback signal including a first signal request to the base station, wherein the at least one first signal is received in response to the first signal request.

The at least one first signal may be transmitted with a resource in which a time or frequency domain resource density is increased N times with respect to a second signal, N may be a positive integer, and the second signal may be a demodulation reference signal (DMRS) or channel state information-reference signal (CSI-RS).

The training of the interference cancellation artificial neural network may comprise: dividing a plurality of transmission resources according to the transmission resource information into a first subset and a second subset, which are distinguishable from each other; configuring channel information estimated using a part of the at least one first signal received through transmission resources of the first subset as first channel information; configuring channel information estimated using another part of the at least one first signal received through transmission resources of the second subset as second channel information; and training the interference cancellation artificial neural network using the first channel information as an input and the second channel information as a target.

The training of the interference cancellation artificial neural network may comprise: configuring a subset from a whole of a plurality of transmission resources according to the transmission resource information; receiving the at least one first signal through the whole of the plurality of the transmission resources; estimating channel information for the whole of the plurality of the transmission resources based on the at least one first signal; substituting channel information corresponding to one or more transmission resources belonging to the subset among the channel information for the whole of the plurality of the entire transmission resources with an arbitrary value; configuring channel information including the substituted arbitrary value as first channel information; configuring second channel information by masking channel information for one or more remaining transmission resources not belonging to the subset from the channel information for the whole of the plurality of the transmission resources; and training the interference cancellation artificial neural network using the first channel information as an input and the second channel information as a target.

In the training of the interference cancellation artificial neural network, the terminal may use at least one of channel estimation type information, information on a variance of a noise level, reception sensitivity information, or frequency resource information as additional information to train the interference cancellation artificial neural network.

The method may further comprise: receiving a second signal from the base station; generating channel information from the second signal using the interference cancellation neural network trained based on the first signal; and transmitting the channel information to the base station.

According to a second exemplary embodiment of the present disclosure, a method of a terminal may comprise: generating frequency-domain channel information based on a first reference signal; generating time-domain channel information from the frequency-domain channel information; compressing the time-domain channel information using an artificial neural network; and generating channel information by transforming the compressed time-domain channel information into frequency-domain channel information.

The method may further comprise: before the generating of the frequency-domain channel information based on the first reference signal, configuring a virtual band including a used band, wherein the terminal generates the frequency-domain channel information for the virtual band based on the first reference signal, and applies a masking technique to the frequency-domain channel information in a region excluding the used band in the virtual band when learning an artificial neural network using the frequency-domain channel information.

The generating of the time-domain channel information from the frequency-domain channel information may comprise: performing inverse Fourier transform on the frequency-domain channel information; and generating the time-domain channel information using samples extracted from a result obtained by the inverse Fourier transform based on a margin due to a synchronization error and a delay spread.

The method may further comprise: receiving a second reference signal from the base station; and training the artificial neural network using the received second reference signal.

According to a third exemplary embodiment of the present disclosure, a method of a base station may comprise: generating first signal configuration information including transmission resource information of a first signal indicated for training; transmitting the first signal configuration information to the terminal; and transmitting at least one first signal to a terminal according to the transmission resource information.

The method may further comprise: receiving, from the terminal, capability information including at least one of information indicating whether the terminal is capable of training the interference cancellation artificial neural network using the first signal, information indicating whether the terminal uses the first signal, information indicating whether the terminal needs the first signal, information on a transmission periodicity of the first signal, or information on a transmission resource of the first signal, wherein the base station configures the transmission resource information based on the capability information.

The method may further comprise: receiving a hybrid automatic repeat and request-acknowledgment (HARQ-ACK) indicating a first signal request from the terminal, wherein the at least one first signal is transmitted in response to the first signal request.

The method may further comprise: receiving a channel state information feedback signal including a first signal request from the terminal, wherein the at least one first signal is transmitted in response to the first signal request.

The method may further comprise: transmitting a second signal to the terminal; and receiving channel information from the terminal, the channel information being generated from the second signal using an interference cancellation artificial neural network trained based on the first signal.

According to the present disclosure, a transmitter may transmit a reference signal indicated for training to a receiver at a transmission time promised between the transmitter and the receiver. In addition, according to the present disclosure, the receiver can train an artificial neural network for canceling interference and/or noise on a channel by receiving the reference signal indicated for training at the transmission time promised between the transmitter and the receiver. In addition, according to the present disclosure, the receiver can train an artificial neural network for compressing channel information by receiving the reference signal indicated for training at the transmission time promised between the transmitter and the receiver. In addition, according to the present disclosure, the terminal can feedback the channel information obtained from a reference signal to the base station using the artificial neural network trained using the reference signal indicated for training.

The effects achievable through specific exemplary embodiments of the present disclosure are not limited to the effects describe above. For example, various technical effects that a person having ordinary skill in the related art can understand or derive from the present disclosure may exist. Accordingly, the specific effects of the present disclosure are not limited to those explicitly described in the present disclosure, and may include various effects that can be understood or derived from the technical features of the present disclosure.

BRIEF DESCRIPTION OF DRAWINGS

The following drawings are made to describe specific exemplary embodiments of the present disclosure. Since the names of specific apparatuses or the names of specific signals/messages/fields described in the drawings are provided merely as examples, the technical features of the present disclosure are not limited to the specific names used in the drawings below.

FIG. 13 is a conceptual diagram illustrating a first exemplary embodiment of the channel information generation method of FIG. 5.

FIG. 14 is a conceptual diagram illustrating a second exemplary embodiment of the channel information generation method of FIG. 5.

DETAILED DESCRIPTION OF THE EMBODIMENTS

Figure 1:
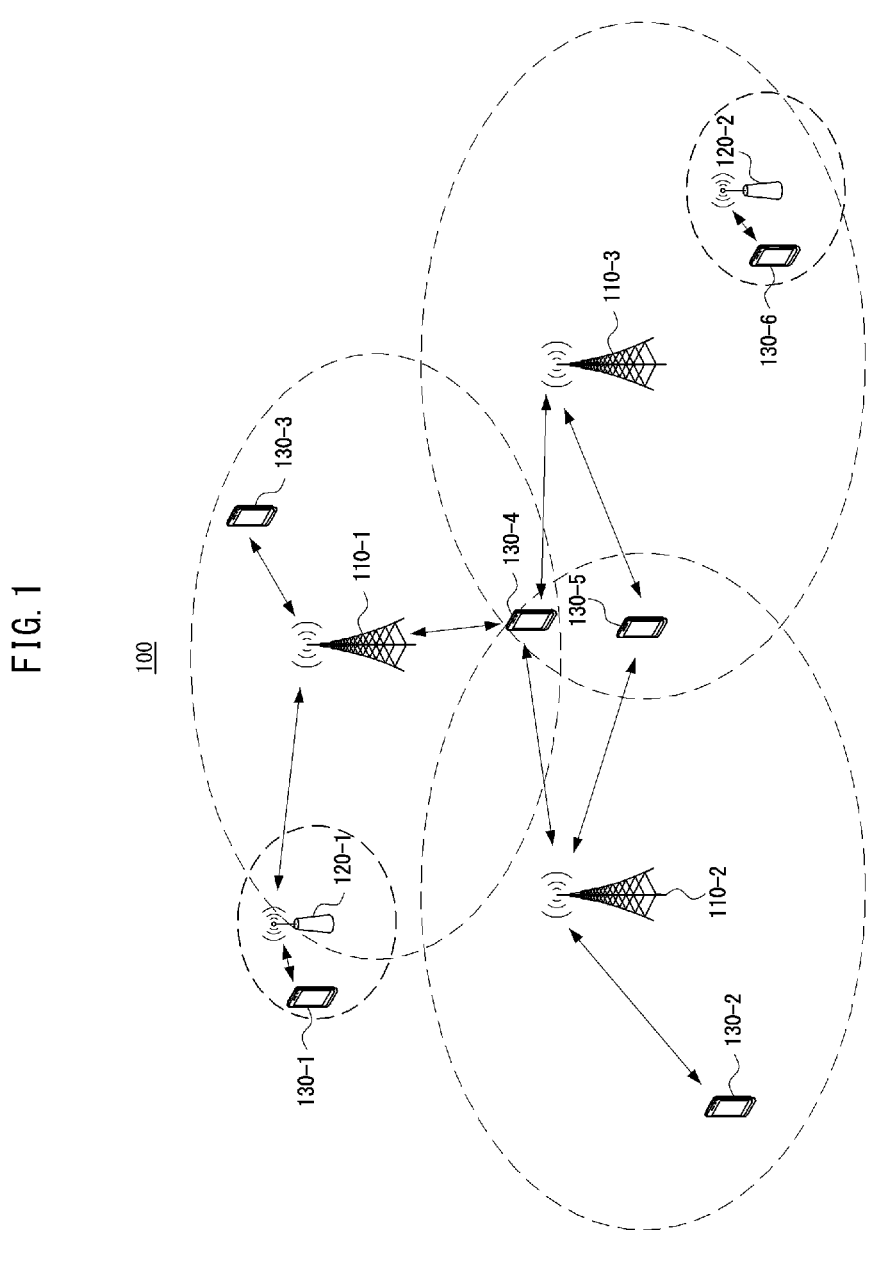
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
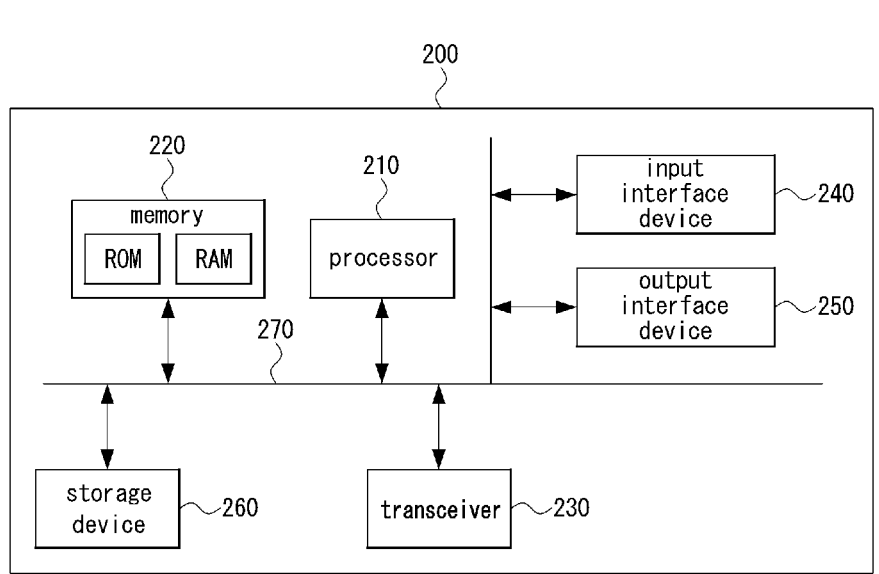
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), New radio (NR), etc.). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Meanwhile, in a mobile communication system, a transmitter may transmit a data signal through a radio channel varying in the time and frequency domain. In this case, the transmitter may transmit a reference signal to a receiver so that the receiver can estimate a degree to which an amplitude and/or phase of the data signal is changed due to the radio channel. Then, the receiver may receive the reference signal from the transmitter. The receiver can estimate the degree to which the amplitude and/or phase of the data signal is changed due to the radio channel by using the received reference signal. The above-described process may be referred to as a channel estimation process. The receiver may perform the channel estimation process for the purpose of demodulating data. Alternatively, the receiver may perform the channel estimation process for the purpose of obtaining channel state information (CSI). Here, the CSI may mean channel information between the transmitter and the receiver, which is required for the transmitter to apply a transmission technique such as multiple input multiple output (MIMO) or precoding. That is, the channel information may include the CSI. The transmitter may transmit a reference signal suitable for a specific purpose to the receiver. For example, the next-generation mobile communication system according to exemplary embodiments of the present disclosure may support reference signals such as a demodulation reference signal (DMRS) for data demodulation and a CSI-reference signal (CSI-RS) for CSI acquisition.

Meanwhile, the receiver may perform channel estimation by applying a least square (LS) scheme. Here, the LS scheme may be a scheme of obtaining a solution that minimizes a square error between a solution to be approximated and an actual solution. Alternatively, the receiver may perform channel estimation by applying a minimum mean square error (MMSE) scheme. Here, the MMSE scheme may be a scheme of obtaining a solution that minimizes a mean square error of a sum of square errors between a solution to be approximated and an actual solution.

Hereinafter, artificial intelligence (AI), which is one of the core implementation technologies of the next-generation mobile communication system, will be described. Although a sixth generation (6G) system is disclosed as an example of the next-generation mobile communication system, it is obvious that the methods and technical features proposed in the present disclosure are not limited to the 6G system.

The most important and newly introduced technology for the 6G system may be AI. The AI was not involved in the 4G system. The 5G system may support partial or very limited AI. However, the 6G system will be AI-enabled for full automation. The advances in machine learning will create more intelligent networks for real-time communication in the 6G system. The introduction of AI in communications can simplify and enhance real-time data transmission. The AI can use a large number of analytics to determine how complex target tasks are performed. In other words, the AI can increase efficiency and reduce processing delays.

Time-consuming tasks such as handover, network selection, and resource scheduling can be performed instantly by using the AI. The AI can also play an important role in machine-to-machine (M2M), machine-to-human, and human-to-machine communications. In addition, the AI can provide a rapid communication in a brain computer interface (BCI). The AI-based communication systems can be supported by various technologies such as metamaterials, intelligent structures, intelligent networks, intelligent devices, intelligent cognitive radios, self-sustaining wireless networks, and machine learning.

Recently, attempts have been made to integrate the AI with wireless communication systems, but these are focused on application layers and network layers. Especially, deep learning techniques are focused upon a technical domain for radio resource management and allocation. However, such the researches are gradually developing into MAC layers and physical layers, and in particular, attempts to combine the deep learning techniques with wireless transmission are appearing in the physical layers. AI-based physical layer transmission means applying an AI-driven signal processing and communication mechanism rather than a traditional communication framework in fundamental signal processing and communication mechanisms. For example, deep learning-based channel coding and decoding, deep learning-based signal estimation and detection, deep learning-based MIMO mechanism, AI-based resource scheduling and allocation, and the like.

The machine learning may be used for channel estimation and channel tracking, and may be used for power allocation, interference cancellation, and the like in a downlink (DL) physical layer. The machine learning may also be used for antenna selection, power control, symbol detection, and the like in a MIMO system.

However, the application of deep neural networks (DNNs) for transmission in the physical layer may have the following problems.

AI algorithms based on deep learning may require a lot of training data to optimize training parameters. However, due to limitations in acquiring data in a specific channel environment as training data, a lot of training data is used offline. Such the static training using the training data in a specific channel environment may cause a contradiction between dynamic characteristics and diversity of the radio channel.

In addition, current deep learning mainly targets real signals. However, physical layer signals of radio communication are complex signals. In order to match the characteristics of the radio communication signals, further research is needed on a neural network that detects the complex-domain signals.

Hereinafter, the machine learning will be described in more detail.

The machine learning refers to a set of operations that train a machine to create a machine that can do tasks that humans can or cannot do. The machine learning requires data and a learning model. In the machine learning, learning methods may be largely classified into three types: supervised learning, unsupervised learning, and reinforcement learning.

The neural network learning is aimed at minimizing errors in outputs. In the neural network learning, training data are repeatedly input to the neural network, errors between a target and outputs of the neural network for the training data are calculated, and the errors of the neural network are back-propagated from an output layer to an input layer of the neural network so as to update weights of the respective nodes in the neural network in a direction in which the errors of the neural network are reduced.

The supervised learning uses training data in which correct answers are labeled, and the unsupervised learning uses training data in which correct answers are not labeled. That is, for example, training data in the case of supervised learning related to data classification may be training data each of which is labeled with a category. The labeled training data may be input to the neural network, and an error may be calculated by comparing an output (category) of the neural network and the label of the training data. The calculated error may be back-propagated in a reverse direction (i.e., from the output layer to the input layer) in the neural network, and connection weights of the respective nodes of the respective layers in the neural network may be updated according to the back-propagation. The amount of change in the updated connection weight of each node may be determined according to a learning rate. The computation using the input data and the backpropagation of the errors in the neural network may constitute a learning cycle (epoch). The learning rate may be applied differently according to the number of iterations of the learning cycle of the neural network. For example, a high learning rate may be used in an early stage of neural network learning to increase efficiency by allowing the neural network to quickly achieve a certain level of performance, and a low learning rate may be used in a later stage thereof to increase accuracy.

The learning method may vary depending on the characteristics of the data. For example, when the purpose is for the receiver to accurately predict data transmitted from the transmitter in the communication system, it may be preferable to perform the learning using the supervised learning rather than the unsupervised learning or reinforcement learning.

The learning model corresponds to a human brain, and the most basic linear model may be considered as the learning model. However, a paradigm of machine learning that uses a neural network structure of high complexity, such as artificial neural networks, as the learning model is called deep learning.

A neural network core used for the learning method may be largely classified into a deep neural network (DNN), a convolutional deep neural network (CNN), and a recurrent neural network (RNN), and the like, and such a learning model may be applied.

As described above, in order to improve the channel estimation method, methods of estimating a channel by combining advanced artificial (AI) and machine learning (ML) technologies with the NR radio transmission technology is recently being considered. For example, in relation to the research direction of applying the AI and ML technologies to channel estimation, a method of estimating a channel using the CNN and the supervised learning method, which is one of the recent deep learning techniques, is being studied. Such the supervised learning method can be applied in a simulation environment where an ideal channel can be known. However, such the supervised learning method cannot be applied in a commercial mobile communication system in which an ideal channel cannot be known. Therefore, such the supervised learning method may be impossible to apply to online learning of an artificial neural network for cancelling interference and/or noise on a channel.

Here, an artificial neural network for cancelling interference and/or noise may be referred to as an interference cancellation artificial neural network. Alternatively, an artificial neural network for canceling interference and/or noise may be referred to as a noise cancellation artificial neural network. Alternatively, an artificial neural network for canceling interference and/or noise may be referred to as an interference and noise cancellation artificial neural network. Accordingly, the terms 'artificial neural network for cancelling interference and/or noise', 'interference cancellation artificial neural network', 'noise cancellation artificial neural network', and 'interference and noise cancellation artificial neural network' may be used interchangeably.

Meanwhile, it may be difficult to obtain a ground truth capable of training an AI model. Considering this situation, a noise-to-noise (N2N) technique has been developed in the field of image processing. Here, the N2N technique may be a method of training an artificial neural network in a self-supervised learning scheme by respectively applying a pair of images having mutually independent interferences and/or noises as an input and a target of the artificial neural network.

Meanwhile, in a mobile communication system, a transmitter may require channel information between the transmitter and a receiver in order to apply a transmission technique such as MIMO or precoding. To this end, the transmitter may acquire the channel information through two schemes. The first scheme among these two schemes may be referred to as a CSI feedback scheme. In the first scheme, the transmitter may transmit a reference signal to the receiver. Then, the receiver may receive the reference signal from the transmitter, measure CSI, and feedback the measured CSI to the transmitter. Then, the transmitter may acquire the CSI by receiving the CSI from the receiver.

The second scheme for acquiring the channel information may be a channel sounding scheme. In the second scheme, the receiver may transmit a reference signal to the transmitter. Then, the transmitter may receive the reference signal from the receiver, and directly measure an uplink channel using the received reference signal. In addition, the transmitter may acquire channel information of a downlink channel by assuming that the measured uplink channel corresponds to the downlink channel.

The next-generation mobile communication system may support both of the two channel information acquisition scheme. First, according to the NR technical specifications, feedback information such as a channel quality indicator (CQI), precoding matrix indicator (PMI), and rank indicator (RI) may be supported in relation to the CSI feedback scheme. Here, the CQI is information corresponding to a downlink signal to interference and noise power ratio (SINR), and may be expressed as a modulation and coding scheme (MCS) that meets a specific target block error rate (BLER). In addition, the PMI, which is information on a precoding selected by the receiver, may be expressed using a pre-promised codebook with the transmitter. The RI may mean the maximum number of layers of a MIMO channel. In addition, the NR technical specifications support a sounding reference signal (SRS), which is a reference signal for estimating an uplink channel, in relation to the channel sounding scheme.

In general, in a time division duplexing (TDD) system in which reciprocity between a downlink channel and an uplink channel is guaranteed, the channel sounding scheme enables the transmitter to obtain more accurate channel information, and thus is more advantageous than the CSI feedback scheme in supporting a sophisticated MIMO transmission technique. However, an uplink reference signal used for the channel sounding scheme has a high transmission load, and as a result, there may be a limitation in that the channel sounding scheme is applicable to only some terminals in the network.

Therefore, a method of improving codebooks so that a sophisticated channel can be expressed even with the CSI feedback scheme may be considered. Specifically, two types of codebooks may be supported to convey the PMI information. In this case, the two types may be named as a type 1 codebook and a type 2 codebook, respectively. The type 1 codebook may represent a beam group with an oversampled discrete Fourier transform (DFT) matrix so that one beam is selected and transmitted from among the beam group. On the other hand, the type 2 codebook may select a plurality of beams, and transmit information in form of a linear combination of the selected beams. The type 2 codebook may have a structure more suitable for supporting a transmission technique such as multi-user MIMO (MU-MIMO) compared to the type 1 codebook. However, the type 2 codebook may greatly increase CSI feedback loads according to the complex codebook structure. In relation to this problem, a method of improving the CSI feedback scheme by combining recently advanced AI and ML technologies with the next-generation wireless transmission technology may be considered.

A technique of combining the AI and ML technologies with the CSI feedback scheme may be progressed to a scheme of obtaining a compressed latent expression for a MIMO channel by using an auto-encoder, which is one of recent deep learning techniques. Here, the auto-encoder may mean a neural network structure that simply copies input to output.

Figure 3:
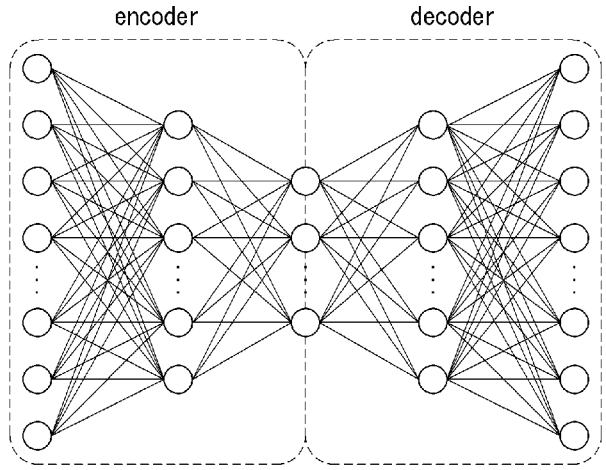
FIG. 3 is a conceptual diagram illustrating a first exemplary embodiment of an auto-encoder.

FIG. 3 is a conceptual diagram illustrating a first exemplary embodiment of an auto-encoder.

Referring to FIG. 3, the auto-encoder may perform data compression (or dimensionality reduction) by configuring the number of neurons of hidden layer(s) between an encoder and a decoder to be smaller than that of an input layer. The auto-encoder may be configured based on a CNN. Here, the encoder may be referred to as a channel compression artificial neural network.

Meanwhile, a method and an apparatus for configuring the encoder and/or decoder, which are proposed in the present disclosure, may be mainly used for downlink of a wireless mobile communication system composed of a base station and a terminal. However, proposed methods of the present disclosure may be extended to any wireless mobile communication system composed of a transmitter and a receiver.

According to an exemplary embodiment of the present disclosure, in the mobile communication system composed of the base station and the terminal, the terminal may configure and utilize an artificial neural network for cancelling interference and/or noise on a channel. In this case, the terminal may apply a denoising CNN (DnCNN) model as one exemplary embodiment of the interference and/or noise cancellation artificial neural network. In this case, the terminal may train the DnCNN model in a supervised learning scheme by using an ideal channel from which interference and/or noise is canceled as a ground truth. However, it may be difficult for the terminal to apply such the supervised learning scheme in a commercial mobile communication environment in which ideal channel information cannot be obtained.

Accordingly, the terminal may perform online learning for the artificial neural network using a self-supervised learning scheme, in which relationships between data are learned, as one of unsupervised learning techniques rather than the supervised learning. However, the self-supervised learning scheme may have a limitation that it can be applied only when data having high cross-correlation is collected. Accordingly, the present disclosure may additionally support a reference signal for artificial neural network training, which supports data generation for the self-supervised learning, in addition to a reference signal used by the base station for data demodulation or CSI acquisition.

Hereinafter, the reference signal used by the base station for data demodulation or CSI acquisition may be referred to as 'first reference signal', and the reference signal for artificial neural network training which supports data generation for the self-supervised learning may be referred to as 'second reference signal'. In this case, the reference signal for training may be referred to as 'training signal' or 'training reference signal'. Accordingly, the training signal may be distinguished from the first reference signal.

Accordingly, for example, the base station may transmit the second reference signal to the terminal at a transmission time pre-promised with the terminal. In this case, the base station may transmit the first reference signal in time period during which training is not performed. Then, the terminal may receive the second reference signal from the base station, and the terminal may train the interference and/or noise cancellation artificial neural network by using the second reference signal.

Meanwhile, according to an exemplary embodiment of the present disclosure, in the mobile communication system composed of the base station and the terminal, the terminal may configure and utilize the artificial neural network for cancelling interference and/or noise on a channel. The base station may support the first reference signal and the second reference signal augmented for training the artificial neural network. In this case, the base station may determine whether it is necessary to transmit the second reference signal to the terminal. To this end, the terminal may report capability information related to the second reference signal to the base station. Accordingly, the base station may receive the capability information related to the second reference signal from the terminal, and may determine whether to transmit the second reference signal and/or transmission resources therefor based on the capability information received from the terminal. For example, the terminal may generate capability information including information on whether or not it has ability to perform training for the artificial neural network using the second reference signal. That is, the capability information may include information on whether or not the terminal is able to train the artificial neural network using the second reference signal. In addition, the terminal may generate capability information including information on whether or not the second reference signal is used and information on whether the second reference signal is needed. That is, the capability information may include information on whether the second reference signal is used or not and information on whether the second reference signal is needed.

Accordingly, the base station may receive, from the terminal, the capability information including information on whether training of the artificial neural network is possible using the second reference signal. In addition, the base station may receive, from the terminal, the capability information including information on whether the second reference signal is used or not and/or information on whether or not the second reference signal is needed. Then, the base station may determine whether to transmit the second reference signal based on the capability information received from the terminal. In this case, the base station may determine that transmission of the second reference signal is necessary when the terminal is capable of training the artificial neural network using the second reference signal. The base station may determine that transmission of the second reference signal is necessary when the terminal uses the second reference signal. Alternatively, the base station may determine that transmission of the second reference signal is necessary when the terminal needs to use the second reference signal. On the other hand, the base station may determine that transmission of the second reference signal is not necessary when the terminal does not use the second reference signal. Alternatively, the base station may determine that transmission of the second reference signal is not necessary when the terminal does not need to use the second reference signal.

In addition, the terminal may generate capability information including a transmission periodicity required for the second reference signal. That is, the capability information may include a transmission periodicity required for the second reference signal. Accordingly, the base station may receive the capability the information including the required transmission periodicity from the terminal, and determine a transmission periodicity of the second reference signal based on the required transmission periodicity included in the capability information.

In addition, the terminal may generate capability information including information of transmission resources required for the second reference signal. That is, the capability information may include information of transmission resources required for the second reference signal. Accordingly, the base station may receive the capability information including information of the required transmission resources from the terminal, and determine transmission resources of the second reference signal based on the information of the required transmission resources included in the capability information.

Figure 4:
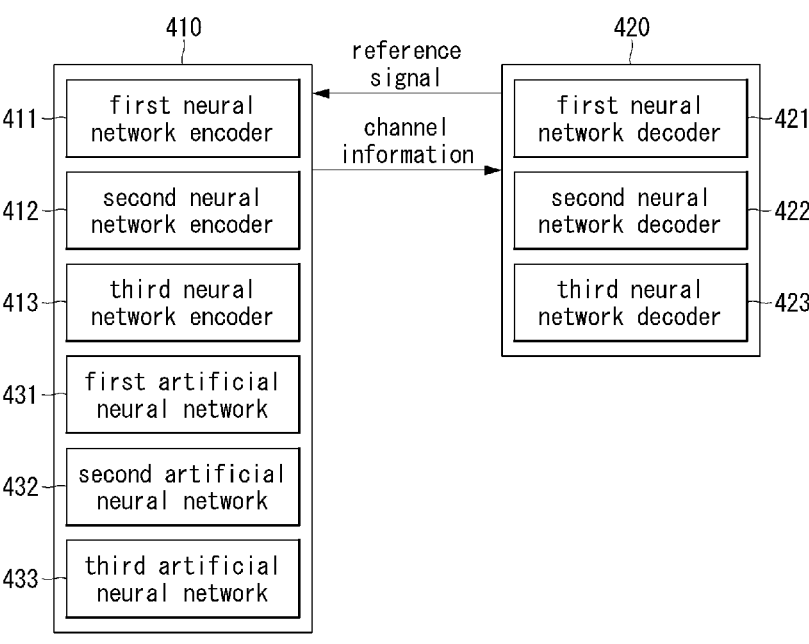
FIG. 4 is a conceptual diagram illustrating a first exemplary embodiment of a channel information transmission apparatus in a communication system.

FIG. 4 is a conceptual diagram illustrating a first exemplary embodiment of a channel information transmission apparatus in a communication system.

Referring to FIG. 4, a terminal 410 may include a first neural network encoder 411, a second neural network encoder 412, and a third neural network encoder 413. Although the terminal 410 has three neural network encoders as described above, the terminal 410 may include N neural network encoders without being limited thereto. Here, the neural network encoder may be a channel compression artificial neural network.

Here, N may be a positive integer. In addition, a base station 420 may include a first neural network decoder 421, a second neural network decoder 422, and a third neural network decoder 423. Although the base station 420 has three neural network decoders as described above, the base station 420 may include N neural network decoders without being limited thereto. Here, the first neural network decoder 421 and the first neural network encoder 411 may operate as a first auto-encoder. In the same manner, the second neural network decoder 422 and the second neural network encoder 412 may operate as a second auto-encoder. In the same manner, the third neural network decoder 423 and the third neural network encoder 413 may operate as a third auto-encoder.

Here, each of the first neural network encoder 411 to third neural network encoder 413 may be configured as a CNN that generates compressed channel information by compressing channel information. In this case, the CNN may remove interference from the channel information, and compress the channel information to generate the compressed channel information with interference removed. Alternatively, the CNN may estimate a channel state based on a reference signal to generate channel information, and compress the channel information to generated compressed channel information. Here, the channel information may include CSI. The CSI may be utilized by the terminal. Alternatively, the CNN may estimate a channel state based on a reference signal, remove interference from the channel state to generate channel information, and compress the channel information to generate compressed channel information with interference removed. Alternatively, the CNN may generate channel information from an estimated channel state, and compress the channel information to generate compressed channel information. Alternatively, the CNN may remove interference from an estimated channel state to generate channel information, and compress the channel information to generate compressed channel information with interference removed. The first neural network encoder 411 to the third neural network encoder 413 may be distinguished by different neural network encoder identifiers (IDs).

Meanwhile, the terminal 410 may include a first artificial neural network 431, a second artificial neural network 432, and a third artificial neural network 433. Although the terminal 410 has three artificial neural networks as described above, the terminal 410 may include M artificial neural networks without being limited thereto. Here, M may be a positive integer. Here, each of the first artificial neural network 431 to the third artificial neural network 433 may be configured as a DnCNN that cancels interference and/or noise on a channel. When the first to third artificial neural networks are configured as DnCNNs, channel information may be estimated for a channel from which interference and/or noise is removed through the first to third artificial neural networks 431 to 433. Accordingly, the first to third neural network encoders 411 to 413 may compress the channel information for the channel from which interference and/or noise is removed through the first to third artificial neural networks 431 to 433, and transmit it to the base station. The DnCNN may be a type of interference cancellation artificial neural network.

Meanwhile, each of the first to third artificial neural networks 431 to 433 may be configured with a DnCNN that removes interference and/or noise on a channel and a CNN that compresses channel information acquired from the channel with interference and/or noise removed. Alternatively, each of the first to third artificial neural networks 431 to 433 may configured with a DnCNN that removes interference and/or noise from a channel and a CNN that acquires channel information from the channel with interference and/or noise removed and compresses the channel information.

The first to third artificial neural networks 431 to 433 described above may be distinguished by different artificial neural network identifiers (IDs). Here, the artificial neural network ID may correspond to an identifier of an artificial neural network model of the terminal 410.

Figure 5:
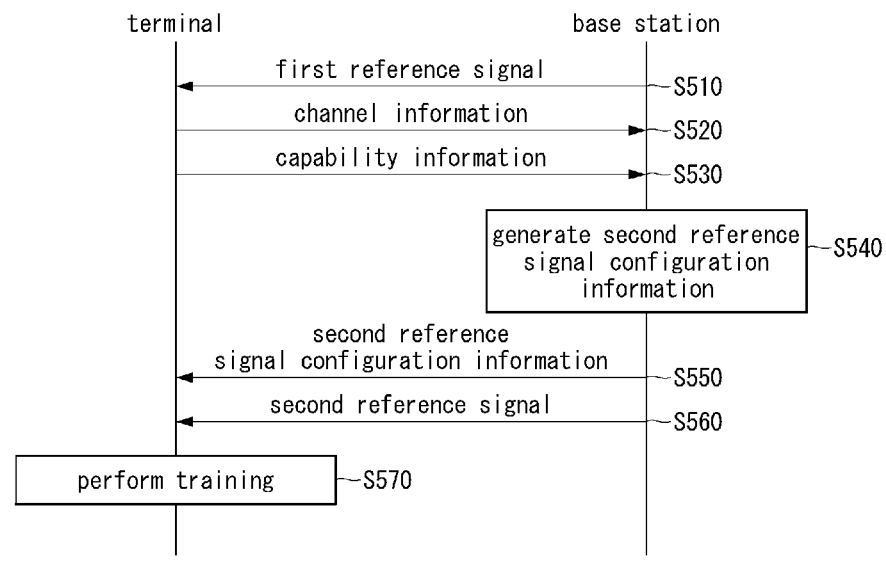
FIG. 5 is a sequence chart illustrating a first exemplary embodiment of a channel information transmission method in a communication system.

FIG. 5 is a sequence chart illustrating a first exemplary embodiment of a channel information transmission method in a communication system.

Referring to FIG. 5, the base station may transmit the first reference signal to the terminal (S510). Here, the first reference signal may be a DMRS, CSI-RS, and/or the like. In this case, the base station may transmit a different first reference signal for each antenna port. Then, the terminal may receive the first reference signal from the base station, and generate channel information by estimating a channel state using at least one of the first to third neural network encoders. Then, the terminal may compress the channel information using at least one of the first to third neural network encoders, and transmit the compressed channel information to the base station (S520). Then, the base station may receive the compressed channel information. In addition, the base station may infer the channel state by restoring the compressed channel information using at least one of the first to third neural network decoders.

Here, the first to third neural network encoders may be implemented to generate channel information by estimating a channel state. That is, the first to third neural network encoders of the terminal may receive the first reference signal from the base station, and generate channel information by estimating a channel state. In addition, at least one of the first to third neural network encoders of the terminal may compress the channel information and transmit the compressed channel information to the base station. Then, the base station may receive the compressed channel information from the terminal, and may infer the channel state by restoring the compressed channel information using at least one of the first to third neural network decoders. However, unlike the above-described approach, the first to third neural network encoders may be implemented to compress and transmit channel information estimated by the terminal. That is, the terminal may receive the first reference signal from the base station, and generate channel information by estimating a channel state. Then, at least one of the first to third neural network encoders of the terminal may compress the channel information and transmit the compressed channel information to the base station. Then, the base station may receive the compressed channel information from the terminal, and may infer the channel state by restoring the compressed channel information using at least one of the first to third neural network decoders.

Referring again to FIG. 4, as an example, the terminal 410 may receive the first reference signal from the base station 420, and use the first neural network encoder 411 to generate channel information by estimating a channel state. In addition, the terminal 410 may compress the channel information using the first neural network encoder 411 and transmit the compressed channel information to the base station 420. Then, the base station 420 may receive the compressed channel information, and may infer the channel state by restoring the compressed channel information using the first neural network decoder 421.

On the other hand, the terminal 410 may receive the first reference signal from the base station 420 and generate channel information by estimating a channel state. In addition, the terminal 410 may compress the channel information using the first neural network encoder 411 and transmit the compressed channel information to the base station 420. Then, the base station 420 may receive the compressed channel information, and may infer the channel state by restoring the compressed channel information using the first neural network decoder 421.

Alternatively, the terminal 410 may receive the first reference signal from the base station 420 and use the second neural network encoder 412 to generate channel information by estimating a channel state. In addition, the terminal 410 may compress the channel information using the second neural network encoder 412 and transmit the compressed channel information to the base station 420. Then, the base station 420 may receive the compressed channel information, and may infer the channel state by restoring the compressed channel information using the second neural network decoder 422.

On the other hand, the terminal 410 may receive the first reference signal from the base station 420 and generate channel information by estimating a channel state. In addition, the terminal 410 may compress the channel information using the second neural network encoder 412 and transmit the compressed channel information to the base station 420. Then, the base station 420 may receive the compressed channel information, and may infer the channel state by restoring the compressed channel information using the second neural network decoder 422.

Alternatively, the terminal 410 may receive the first reference signal from the base station 420 and use the third neural network encoder 413 to generate channel information by estimating a channel state. In addition, the terminal 410 may compress the channel information using the third neural network encoder 413 and transmit the compressed channel information to the base station 420. Then, the base station 420 may receive the compressed channel information, and may infer the channel state by restoring the compressed channel information using the third neural network decoder 423.

On the other hand, the terminal 410 may receive the first reference signal from the base station 420 and generate channel information by estimating a channel state. In addition, the terminal 410 may compress the channel information using the third neural network encoder 413 and transmit the compressed channel information to the base station 420. Then, the base station 420 may receive the compressed channel information, and may infer the channel state by restoring the compressed channel information using the third neural network decoder 423.

Referring again to FIG. 5, the terminal may generate capability information related to the second reference signal. For example, the terminal may generate capability information including whether or not the terminal has the ability to perform training for the artificial neural networks using the second reference signal. That is, the capability information may include information on whether or not the terminal is capable of training the artificial neural networks using the second reference signal. In addition, the terminal may generate capability information including information on whether or not the second reference signal is used and information on whether the second reference signal is needed. That is, the capability information may include information on whether the second reference signal is used or not and information on whether the second reference signal is needed. In addition, the terminal may generate capability information including information on a requested transmission periodicity required for the second reference signal. That is, the capability information may include information on the requested transmission periodicity required for the second reference signal. In addition, the terminal may generate capability information including information on transmission resources required for the second reference signal. That is, the capability information may include the information on transmission resources required for the second reference signal.

Then, the terminal may transmit the capability information related to the second reference signal to the base station. In this case, the terminal may transmit the capability information related to the second reference signal to the base station before transmitting the first reference signal. Accordingly, the base station may receive the capability information related to the second reference signal from the terminal. In addition, the base station may determine whether to transmit the second reference signal and/or transmission resources for the second reference signal based on the capability information received from the terminal. For example, the base station may receive, from the terminal, the capability information including the information on whether training of the artificial neural network using the second reference signal is possible. In addition, the base station may receive, from the terminal, the capability information including the information on whether the second reference signal is used or not and/or the information on whether or not the second reference signal is needed, and may determine whether to transmit the second reference signal based on the capability information received from the terminal. In this case, the base station may determine that transmission of the second reference signal is necessary when the terminal is capable of training the artificial neural networks using the second reference signal.

The base station may determine that transmission of the second reference signal is necessary when the terminal uses the second reference signal. Alternatively, the base station may determine that transmission of the second reference signal is necessary when the terminal needs to use the second reference signal. On the other hand, the base station may determine that transmission of the second reference signal is not necessary when the terminal does not use the second reference signal. Alternatively, the base station may determine that transmission of the second reference signal is not necessary when the terminal does not need to use the second reference signal. In addition, the base station may determine a transmission periodicity of the second reference signal based on the requested transmission periodicity included in the capability information. In addition, the base station may determine transmission resources of the second reference signal based on the information on the required transmission resources included in the capability information.

Meanwhile, the base station may configure the second reference signal for training at least one of the first to third artificial neural networks. Here, the configuration of the second reference signal may include configuration of a transmission time of the second reference signal. For example, the second reference signal for the first artificial neural network may be a second-one reference signal, the second reference signal for the second artificial neural network may be a second-two reference signal, and the second reference signal for the third artificial neural network may be a second-three reference signal. In this case, the base station may configure candidate transmission times by configuring multiple transmission times of the second reference signal, and may configure the candidate transmission times of the second reference signal as a transmission time candidate group.

Referring again to FIG. 4, for example, the base station 420 may configure the second-one reference signal for training of the first artificial neural network. In this case, the base station 420 may configure a transmission time of the second-one reference signal for training of the first artificial neural network. In this case, the base station 420 may configure candidate transmission times by configuring multiple transmission times of the second-one reference signal. In addition, the base station 420 may configure the candidate transmission times of the second-one reference signal as a transmission time candidate group.

In addition, the base station 420 may configure the second-two reference signal for training of the second artificial neural network. In this case, the base station 420 may configure a transmission time of the second-two reference signal for training of the second artificial neural network. In this case, the base station 420 may configure candidate transmission times by configuring multiple transmission times of the second-two reference signal. In addition, the base station 420 may configure the candidate transmission times of the second-two reference signal as a transmission time candidate group.

In addition, the base station 420 may configure the second-three reference signal for training of the third artificial neural network. In this case, the base station 420 may configure a transmission time of the second-three reference signal for training of the third artificial neural network. In this case, the base station 420 may configure candidate transmission times by configuring multiple transmission times of the second-three reference signal. In addition, the base station 420 may configure the candidate transmission times of the second-three reference signal as a transmission time candidate group.

Referring again to FIG. 5, the base station may generate information on the configuration of the second reference signal (S540). That is, the base station may generate second reference signal configuration information. In this case, the base station may generate transmission time configuration information of the second reference signal. Alternatively, the base station may generate transmission time candidate group configuration information of the second reference signal. Accordingly, the base station may generate second reference signal configuration information including the transmission time configuration information of the second reference signal. Alternatively, the base station may generate second reference signal configuration information including the transmission time candidate group configuration information of the second reference signal. Here, the transmission time configuration information may refer to 'configuration information of transmission time(s)', and the transmission time candidate group configuration information' may refer to 'configuration information of a transmission time candidate group'.

Referring again to FIG. 4, for example, the base station 420 may generate information on the configuration of the second-one reference signal for training of the first artificial neural network. That is, the base station 420 may generate second-one reference signal configuration information. In this case, the base station 420 may generate transmission time configuration information of the second-one reference signal. Alternatively, the base station 420 may generate transmission time candidate group configuration information of the second-one reference signal. Accordingly, the base station 420 may generate second-one reference signal configuration information including the transmission time configuration information of the second-one reference signal. Alternatively, the base station 420 may generate second-one reference signal configuration information including the transmission time candidate group configuration information of the second-one reference signal.

In addition, the base station 420 may generate information on the configuration of the second-two reference signal for training of the second artificial neural network. That is, the base station 420 may generate second-two reference signal configuration information. In this case, the base station 420 may generate transmission time configuration information of the second-two reference signal. Alternatively, the base station 420 may generate transmission time candidate group configuration information of the second-two reference signal. Accordingly, the base station 420 may generate second-two reference signal configuration information including the transmission time configuration information of the second-two reference signal. Alternatively, the base station 420 may generate second-two reference signal configuration information including the transmission time candidate group configuration information of the second-two reference signal.

In addition, the base station 420 may generate information on the configuration of the second-three reference signal for training of the third artificial neural network. That is, the base station 420 may generate second-three reference signal configuration information. In this case, the base station 420 may generate transmission time configuration information of the second-three reference signal. Alternatively, the base station 420 may generate transmission time candidate group configuration information of the second-three reference signal. Accordingly, the base station 420 may generate second-three reference signal configuration information including the transmission time configuration information of the second-three reference signal. Alternatively, the base station 420 may generate the second-three reference signal configuration information including the transmission time candidate group configuration information of the second-three reference signal.

Referring again to FIG. 5, the base station may transmit the second reference signal configuration information including the transmission time configuration information of the second reference signal to the terminal (S550). In this case, the base station may transmit the second reference signal configuration information to the terminal using a higher layer signal. Here, the higher layer signal may be radio resource control (RRC) signaling or MAC medium access control element (CE). Alternatively, the base station may transmit the second reference signal configuration information to the terminal using a dynamic control signal. Here, the dynamic control signal may be downlink control information (DCI). In addition, the base station may transmit information on an identifier of a neural network encoder capable of receiving the second reference signal and performing training using the second reference signal. In addition, the base station may transmit information on an identifier of a cell or transmission and reception point (TRP) to which the second reference signal is applied, and the like to the terminal.

Then, the terminal may receive the second reference signal configuration information including the transmission time configuration information of the second reference signal from the base station, and may obtain the transmission time configuration information of the second reference signal from the second reference signal configuration information. In this case, when the terminal receives the second reference signal configuration information through the MAC CE, the corresponding configuration may be applied after a specific number of slots promised with the base station from a reception time of the MAC CE.

Referring again to FIG. 4, for example, the base station 420 may transmit second-one reference signal configuration information including transmission time configuration information of the second-one reference signal to the terminal 410. In this case, the base station 420 may transmit the second-one reference signal configuration information to the terminal 410 using a higher layer signal. Here, the higher layer signal may be RRC signaling or MAC CE. Alternatively, the base station 420 may transmit the second-one reference signal configuration information to the terminal 410 using a dynamic control signal. Here, the dynamic control signal may be DCI. In addition, the base station 420 may transmit information on an identifier of the artificial neural network 431 capable of receiving the second-one reference signal and performing training using the second-one reference signal. In addition, the base station may transmit information on an identifier of a cell or TRP to which the second-one reference signal is applied, and the like to the terminal 410.

Then, the terminal 410 may receive the second-one reference signal configuration information including the transmission time configuration information of the second-one reference signal from the base station 420, and may obtain the transmission time configuration information of the second-one reference signal from the second-one reference signal configuration information. In this case, when the terminal 410 receives the second-one reference signal configuration information through the MAC CE, the terminal 410 may apply the corresponding configuration after a specific number of slots promised with the base station from a reception time of the MAC CE.

In addition, the base station 420 may transmit second-two reference signal configuration information including transmission time configuration information of the second-two reference signal to the terminal 410. In this case, the base station 420 may transmit the second-two reference signal configuration information to the terminal 410 using a higher layer signal. Here, the higher layer signal may be RRC signaling or MAC CE. Alternatively, the base station 420 may transmit the second-two reference signal configuration information to the terminal 410 using a dynamic control signal. Here, the dynamic control signal may be DCI. In addition, the base station 420 may transmit information on an identifier of the second artificial neural network 432 capable of receiving the second-two reference signal and performing training using the second-two reference signal. In addition, the base station may transmit information on an identifier of a cell or TRP to which the second-two reference signal is applied, and the like to the terminal 410.

Then, the terminal 410 may receive the second-two reference signal configuration information including the transmission time configuration information of the second-two reference signal from the base station 420, and may obtain the transmission time configuration information of the second-two reference signal from the second-two reference signal configuration information. In this case, when the terminal 410 receives the second-two reference signal configuration information through the MAC CE, the terminal 410 may apply the corresponding configuration after a specific number of slots promised with the base station from a reception time of the MAC CE.

In addition, the base station 420 may transmit second-three reference signal configuration information including transmission time configuration information of the second-three reference signal to the terminal 410. In this case, the base station 420 may transmit the second-three reference signal configuration information to the terminal 410 using a higher layer signal. Here, the higher layer signal may be RRC signaling or MAC CE. Alternatively, the base station 420 may transmit the second-three reference signal configuration information to the terminal 410 using a dynamic control signal. Here, the dynamic control signal may be DCI. In addition, the base station 420 may transmit information on an identifier of the third artificial neural network 433 capable of receiving the second-three reference signal and performing training using the second-three reference signal. In addition, the base station may transmit information on an identifier of a cell or TRP to which the second-three reference signal is applied, and the like to the terminal 410.

Then, the terminal 410 may receive the second-three reference signal configuration information including the transmission time configuration information of the second-three reference signal from the base station 420, and may obtain the transmission time configuration information of the second-three reference signal from the second-three reference signal configuration information. In this case, when the terminal 410 receives the second-three reference signal configuration information through the MAC CE, the terminal 410 may apply the corresponding configuration after a specific number of slots promised with the base station from a reception time of the MAC CE.

On the other hand, the base station 420 may transmit second reference signal configuration information including transmission time candidate group configuration information of the second reference signal to the terminal 410. In this case, the base station 420 may transmit the second reference signal configuration information to the terminal 410 using a higher layer signal. Here, the higher layer signal may be RRC signaling or MAC CE. In addition, the base station 420 may transmit information on an identifier of an artificial neural network capable of receiving the second reference signal and performing training using the second reference signal to the terminal 410. In addition, the base station 420 may transmit information of an identifier of a cell or TRP to which the second reference signal is applied, and the like to the terminal 410.

Then, the terminal 410 may receive the second reference signal configuration information including the transmission time candidate group configuration information of the second reference signal from the base station 420, and may obtain the transmission time candidate group configuration information of the second reference signal from the second reference signal configuration information. Accordingly, the terminal 410 may identify the transmission time candidate group of the second reference signal. In this case, when the terminal 410 receives the second reference signal configuration information through the MAC CE, the terminal 410 may apply the corresponding configuration after a specific number of slots promised with the base station 420 from a reception time of the MAC CE.

For example, the base station 420 may transmit second-one reference signal configuration information including transmission time candidate group configuration information of the second-one reference signal to the terminal 410. In this case, the base station 420 may transmit the second-one reference signal configuration information to the terminal 410 using a higher layer signal. Here, the higher layer signal may be RRC signaling or MAC CE. In addition, the base station 420 may transmit information on an identifier of the first artificial neural network 431 capable of receiving the second-one reference signal and performing training using the second-one reference signal to the terminal 410. In addition, the base station 420 may transmit information on an identifier of a cell or TRP to which the second-one reference signal is applied, and the like to the terminal 410.

Then, the terminal 410 may receive the second-one reference signal configuration information including the transmission time candidate group configuration information of the second-one reference signal from the base station 420, and may obtain the transmission time candidate group configuration information of the second-one reference signal from the second-one reference signal configuration information. Accordingly, the terminal 410 may identify the transmission time candidate group of the second-one reference signal. In this case, when the terminal 410 receives the second-one reference signal configuration information through the MAC CE, the terminal 410 may apply the corresponding configuration after a specific number of slots promised with the base station 420 from a reception time of the MAC CE.

In addition, the base station 420 may transmit second-two reference signal configuration information including transmission time candidate group configuration information of the second-two reference signal to the terminal 410. In this case, the base station 420 may transmit the second-two reference signal configuration information to the terminal 410 using a higher layer signal. Here, the higher layer signal may be RRC signaling or MAC CE. In addition, the base station 420 may transmit information on an identifier of the second artificial neural network 432 capable of receiving the second-two reference signal and performing training using the second-two reference signal to the terminal 410. In addition, the base station 420 may transmit information on an identifier of a cell or TRP to which the second-two reference signal is applied, and the like to the terminal 410.

Then, the terminal 410 may receive the second-two reference signal configuration information including the transmission time candidate group configuration information of the second-two reference signal from the base station 420, and may obtain the transmission time candidate group configuration information of the second-two reference signal from the second-two reference signal configuration information. Accordingly, the terminal 410 may identify the transmission time candidate group of the second-two reference signal. In this case, when the terminal 410 receives the second-two reference signal configuration information through the MAC CE, the terminal 410 may apply the corresponding configuration after a specific number of slots promised with the base station 420 from a reception time of the MAC CE.

In addition, the base station 420 may transmit second-three reference signal configuration information including transmission time candidate group configuration information of the second-three reference signal to the terminal 410. In this case, the base station 420 may transmit the second-three reference signal configuration information to the terminal 410 using a higher layer signal. Here, the higher layer signal may be RRC signaling or MAC CE. In addition, the base station 420 may transmit information on an identifier of the third artificial neural network 433 capable of receiving the second-three reference signal and performing training using the second-three reference signal to the terminal 410. In addition, the base station 420 may transmit information on an identifier of a cell or TRP to which the second-three reference signal is applied, and the like to the terminal 410.

Then, the terminal 410 may receive the second-three reference signal configuration information including the transmission time candidate group configuration information of the second-three reference signal from the base station 420, and may obtain the transmission time candidate group configuration information of the second-three reference signal from the second-three reference signal configuration information. Accordingly, the terminal 410 may identify the transmission time candidate group of the second-three reference signal. In this case, when the terminal 410 receives the second-three reference signal configuration information through the MAC CE, the terminal 410 may apply the corresponding configuration after a specific number of slots promised with the base station 420 from a reception time of the MAC CE.

Meanwhile, the base station 420 may select a specific candidate from the transmission time candidate group of the second reference signal, and may transmit second reference signal candidate indication information including indication information indicating the selected specific candidate to the terminal 410. In this case, the base station 420 may transmit the second reference signal candidate indication information to the terminal 410 using a dynamic control signal. Here, the dynamic control signal may be DCI. In addition, the base station 420 may transmit information on an identifier of an artificial neural network capable of receiving the second reference signal and performing training using the second reference signal to the terminal 410. In addition, the base station 420 may transmit information of an identifier of a cell or TRP to which the second reference signal is applied, and the like to the terminal 410.

Then, the terminal 410 may receive, from the base station, the indication information indicating the specific candidate from the transmission time candidate group of the second reference signal, and may identify a transmission time of the second reference signal, which corresponds to the specific candidate indicated by the received indication information.

For example, the base station 420 may select a specific candidate from the transmission time candidate group of the second-one reference signal, and may transmit second-one reference signal candidate indication information including indication information indicating the selected specific candidate to the terminal 410. In this case, the base station 420 may transmit the second-one reference signal candidate indication information to the terminal 410 using a dynamic control signal. Here, the dynamic control signal may be DCI. In addition, the base station 420 may transmit information of an identifier of the first artificial neural network 431 capable of receiving the second-one reference signal and performing training using the second-one reference signal to the terminal 410. In addition, the base station 420 may transmit information on an identifier of a cell or TRP to which the second-one reference signal is applied, and the like to the terminal 410.

Then, the terminal 410 may receive the indication information indicating the specific candidate from the transmission time candidate group of the second-one reference signal from the base station 420, and may identify a transmission time of the second-one reference signal, which corresponds to the specific candidate indicated by the received indication information.

In addition, the base station 420 may select a specific candidate from the transmission time candidate group of the second-two reference signal, and may transmit second-two reference signal candidate indication information including information indicating the selected specific candidate to the terminal 410. In this case, the base station 420 may transmit the second-two reference signal candidate indication information to the terminal 410 using a dynamic control signal. Here, the dynamic control signal may be DCI. In addition, the base station 420 may transmit information on an identifier of the second artificial neural network 432 capable of receiving the second-two reference signal and performing training using the second-two reference signal to the terminal 410. In addition, the base station 420 may transmit information of an identifier of a cell or TRP to which the second-two reference signal is applied, and the like to the terminal 410.

Then, the terminal 410 may receive the indication information indicating the specific candidate from the transmission time candidate group of the second-two reference signal from the base station 420, and may identify a transmission time of the second-two reference signal, which corresponds to the specific candidate indicated by the received indication information.

In addition, the base station 420 may select a specific candidate from the transmission time candidate group of the second-three reference signal, and may transmit second-three reference signal candidate indication information including information indicating the selected specific candidate to the terminal 410. In this case, the base station 420 may transmit the second-three reference signal candidate indication information to the terminal 410 using a dynamic control signal. Here, the dynamic control signal may be DCI. In addition, the base station 420 may transmit information on an identifier of the third artificial neural network 433 capable of receiving the second-three reference signal and performing training using the second-three reference signal to the terminal 410. In addition, the base station 420 may transmit information of an identifier of a cell or TRP to which the second-three reference signal is applied, and the like to the terminal 410.

Then, the terminal 410 may receive the information indicating the specific candidate from the transmission time candidate group of the second-three reference signal from the base station 420, and may identify a transmission time of the second-three reference signal, which corresponds to the specific candidate indicated by the received indication information.

Referring again to FIG. 5, the base station may transmit the second reference signal to the terminal at a transmission time according to the transmission time configuration information of the second reference signal (S560). In this case, the base station may transmit the second reference signal to the terminal even when there is no data. Then, the terminal may receive the second reference signal at the transmission time of the second reference signal according to the transmission time configuration information of the second reference signal, and train at least one of the first to third artificial neural networks using the received second reference signal (S570).

Referring again to FIG. 4, for example, the base station 420 may transmit the second-one reference signal to the terminal 410 at a transmission time according to the transmission time configuration information of the second-one reference signal. Then, the terminal 410 may receive the second-one reference signal at the transmission time of the second-one reference signal according to the transmission time configuration information of the second-one reference signal, and may train the first artificial neural network 431 using the received second-one reference signal.

In addition, the base station 420 may transmit the second-two reference signal to the terminal 410 at a transmission time according to the transmission time configuration information of the second-two reference signal. Then, the terminal 410 may receive the second-two reference signal at the transmission time of the second-two reference signal according to the transmission time configuration information of the second-two reference signal, and may train the second artificial neural network 432 using the received second-two reference signal.

In addition, the base station 420 may transmit the second-three reference signal to the terminal 410 at a transmission time according to the transmission time configuration information of the second-three reference signal. Then, the terminal 410 may receive the second-three reference signal at the transmission time of the second-three reference signal according to the transmission time configuration information of the second-three reference signal, and may train the third artificial neural network 433 using the received second-three reference signal.

Meanwhile, the base station may transmit the first reference signal to the terminal. Here, the first reference signal may be a DMRS, CSI-RS, and/or the like. In this case, the base station may transmit a different first reference signal for each antenna port. Then, the terminal may receive the first reference signal from the base station, and generate channel information by estimating a channel state using at least one of the trained first to third neural network encoders. In addition, the terminal may compress the channel information using at least one of the trained first to third neural network encoders, and transmit the compressed channel information to the base station. Then, the base station may receive the compressed channel information, and may infer the channel state by restoring the compressed channel information using at least one of the first to third neural network decoders.

Figure 6:
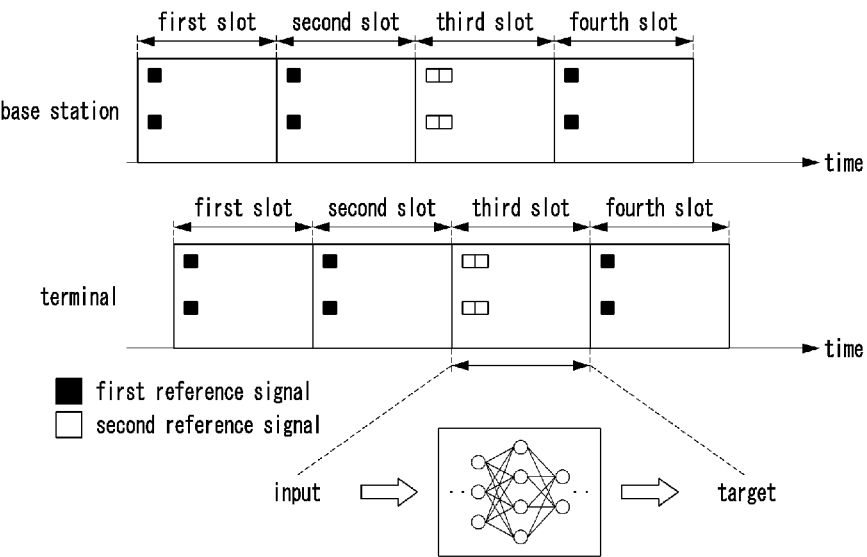
FIG. 6 is a conceptual diagram illustrating a first exemplary embodiment of a process of transmitting the first reference signal and the second reference signal by the base station.

FIG. 6 is a conceptual diagram illustrating a first exemplary embodiment of a process of transmitting the first reference signal and the second reference signal by the base station.

Referring to FIG. 6, the base station may transmit the first reference signal to the terminal in a first slot, a second slot, and a fourth slot with reference to a predetermined time, and the base station may transmit the second reference signal in a third slot with reference to the predetermined time. In this case, the base station may transmit the second reference signal after a time offset elapses from a start time of the third slot. Here, the time offset may indicate a time resource location in which the second reference signal starts in the third slot, that is, a time resource location in which the second reference signal starts to be mapped. In addition, the base station may periodically and repeatedly transmit the second reference signal to the terminal according to a transmission periodicity. Here, the transmission periodicity may mean an interval at which the second reference signal is repeated.

Accordingly, the base station may generate transmission time configuration information of the second reference signal, which includes resource region information (e.g., third slot), time offset information, and transmission periodicity information. The base station may transmit the transmission time configuration information of the second reference signal to the terminal before transmitting the second reference signal to the terminal. Then, the terminal may receive the transmission time configuration information of the second reference signal from the base station.

Accordingly, the terminal may obtain the resource region information, time offset information, and transmission periodicity information from the transmission time configuration information of the second reference signal. Thereafter, the terminal may receive the first reference signal from the base station in the first slot, the second slot, and the fourth slot, and the terminal may receive the second reference signal from the base station in the third slot based on the resource region information, time offset information, and transmission periodicity information obtained from the transmission time configuration information of the second reference signal. The terminal may train the artificial neural networks using the received second reference signal.

Meanwhile, the second reference signal may have a transmission start time and a transmission end time. Accordingly, the base station may generate the transmission time configuration information of the second reference signal, which includes the resource region information (e.g., information indicating the third slot), transmission start time information, and transmission end time information. The base station may transmit the transmission time configuration information of the second reference signal to the terminal before transmitting the second reference signal to the terminal. Then, the terminal may receive the transmission time configuration information of the second reference signal from the base station.

Accordingly, the terminal may obtain the resource region information, transmission start time information, and transmission end time information from the transmission time configuration information of the second reference signal. Thereafter, the terminal may receive the first reference signal from the base station in the first slot, the second slot, and the fourth slot, and may receive the second reference signal from the base station in the third slot based on the resource region information, transmission start time information, and transmission end time information obtained from the transmission time configuration information of the second reference signal. The terminal may train the artificial neural networks using the received second reference signal.

Alternatively, the second reference signal may have a specific time, that is, a time stamp. Accordingly, the base station may generate second reference signal configuration information including resource region information (e.g., information indicating the third slot) and the specific time. Accordingly, the base station may generate transmission time configuration information of the second reference signal including resource region information (e.g., third slot) and specific time information. Then, the base station may transmit the transmission time configuration information of the second reference signal to the terminal before transmitting the second reference signal to the terminal.

Then, the terminal may receive the transmission time configuration information of the second reference signal from the base station. Accordingly, the terminal may obtain the resource region information and the specific time information from the transmission time configuration information of the second reference signal. Thereafter, the terminal may receive the first reference signal from the base station in the first slot, the second slot, and the fourth slot, and may receive the second reference signal from the base station in the third slot based on the resource region information and the specific time information obtained from the transmission time configuration information of the second reference signal. The terminal may train the artificial neural networks using the received second reference signal.

Figure 7:
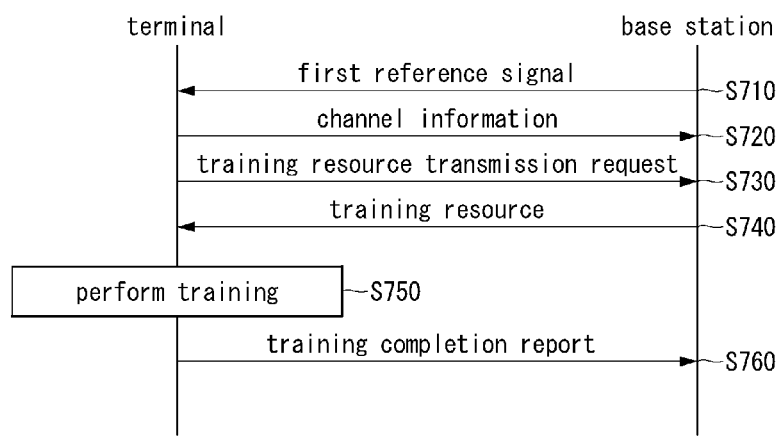
FIG. 7 is a sequence chart illustrating a second exemplary embodiment of a channel information transmission method in a communication system.

FIG. 7 is a sequence chart illustrating a second exemplary embodiment of a channel information transmission method in a communication system.

Referring to FIG. 7, the base station may transmit the first reference signal to the terminal (S710). Here, the first reference signal may be a DMRS, CSI-RS, and/or the like. In this case, the base station may transmit a different first reference signal for each antenna port. Then, the terminal may receive the first reference signal from the base station, and generate channel information by estimating a channel state using at least one of the first to third neural network encoders. Then, the terminal may compress the channel information using at least one of the first to third neural network encoders, and transmit the compressed channel information to the base station (S720). Then, the base station may receive the compressed channel information, and may infer the channel state by restoring the compressed channel information using at least one of the first to third neural network decoders.

Thereafter, the terminal may transmit a training resource transmission request signal requesting transmission of a training resource to the base station (S730). Here, the training resource may be a reference signal having a high-density resource compared to a normal operation mode. Alternatively, the training resource may be a reference signal that is repeated in the time domain and/or the frequency domain. Alternatively, the training resource may be a data signal repeated in the time domain and/or the frequency domain. The training resource may be a resource indicated for training.

In this case, the terminal may transmit the training resource transmission request signal to the base station using a higher layer signal. Here, the higher layer signal may be RRC signaling or MAC CE. Alternatively, the terminal may request transmission of a training resource from the base station when reporting control information. Alternatively, the terminal may transmit a request for transmission of a training resource to the base station by including the request in a dedicated physical channel. For example, the terminal may transmit training resource transmission request information to the base station through a physical channel dedicated to the training resource transmission request.

On the other hand, the base station may receive the training resource transmission request signal from the terminal, and may transmit a training resource to the terminal (S740). In this case, the training resource transmitted from the base station to the terminal may be a signal having allocated resources with a high cross-correlation therebetween. For example, the base station may transmit a reference signal having a high-density resource compared to a normal operation mode to the terminal. Alternatively, the base station may transmit a reference signal repeated in the time domain and/or frequency domain to the terminal.

Alternatively, the base station may transmit a data signal repeated in the time domain and/or frequency domain to the terminal.

Accordingly, the terminal may receive the training resource from the base station, and train the artificial neural network using the received training resource (S750). In this case, when the training resource is a reference signal having a high-density resource, the terminal may estimate a channel for each subset of the high-density resource. In addition, the terminal may train the artificial neural network by securing channel data sets that experience mutually-independent interferences and/or noises for the respective subsets. Alternatively, when the training resource is a reference signal or data signal that is repeated in the time domain and/or frequency domain, the terminal may estimate a channel for each subset of resources constituting the corresponding signal. In addition, the terminal may train the artificial neural network by securing channel data sets that experience mutually-independent interferences and/or noises for the respective subsets.

Thereafter, when the training of the artificial neural network is completed, the terminal may transmit a training completion report signal to the base station (S760). Then, the base station may receive the training completion report signal from the terminal. Accordingly, the base station may no longer transmit the training resource to the terminal.

Meanwhile, in FIG. 7, the terminal may receive the training resource from the base station by explicitly transmitting the training resource transmission request signal requesting transmission of the training resource to the base station. However, unlike the above-described approach, the terminal may not request transmission of the training resource from the base station. In this case, the base station may transmit the training resource to the terminal even without explicit request of the terminal. In this case, the training resource transmitted from the base station to the terminal may be a signal having allocated resources with a high cross-correlation therebetween. For example, the base station may transmit a reference signal having a high-density resource compared to a normal operation mode to the terminal. Alternatively, the base station may transmit a reference signal repeated in the time domain and/or frequency domain to the terminal. Alternatively, the base station may transmit a data signal repeated in the time domain and/or frequency domain to the terminal.

Accordingly, the terminal may receive the training resource from the base station. In this case, the terminal may determine that the received reference signal is a training resource when it is a reference signal having a high-density resource. In the case of a reference signal having a high-density resource, the terminal may estimate a channel for each subset of the high-density resource. In addition, the terminal may train the artificial neural network by securing channel data sets that experience mutually-independent interferences and/or noises for the respective subsets.

Alternatively, when the received signal is a reference signal or data signal that is repeated in the time domain and/or frequency domain, the terminal may determine the received signal is a training signal. When the received signal is a reference signal or data signal that is repeated in the time domain and/or frequency domain, the terminal may estimate a channel for each subset of resources constituting the corresponding signal. In addition, the terminal may train the artificial neural network by securing channel data sets that experience mutually-independent interferences and/or noises for the respective subsets. Thereafter, the terminal may transmit a training completion report signal to the base station when training of the artificial neural network is completed. Then, the base station may receive the training completion report signal from the terminal. Accordingly, the base station may no longer transmit the training resource to the terminal.

Thereafter, the base station may transmit the first reference signal to the terminal. Here, the first reference signal may be a DMRS, CSI-RS, or the like. In this case, the base station may transmit a different first reference signal for each antenna port. Then, the terminal may receive the first reference signal from the base station, and generate channel information by estimating a channel state using at least one of the first to third neural network encoders trained through the training resource. In addition, the terminal may compress the channel information using at least one of the first to third neural network encoders trained through the training resource, and transmit the compressed channel information to the base station.

Figure 8:
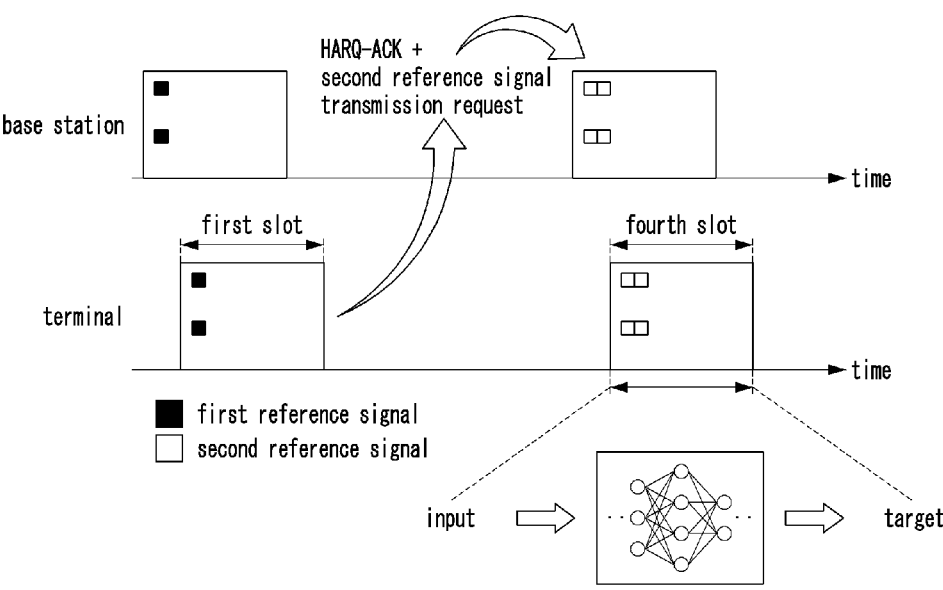
FIG. 8 is a conceptual diagram illustrating a first embodiment exemplary of a procedure of requesting the second reference signal.

FIG. 8 is a conceptual diagram illustrating a first embodiment exemplary of a procedure of requesting the second reference signal.

Referring to FIG. 8, when the first reference signal is used as a DMRS, the terminal may transmit second reference signal request information to the base station when transmitting a HARQ-ACK. That is, when reporting HARQ-ACK information corresponding to a PDSCH received from the base station, the terminal may indicate a second reference signal transmission request. On the other hand, when the first reference signal is used as a CSI-RS, the terminal may transmit second reference signal request information to the base station by including it in a CSI feedback when transmitting the CSI feedback to the base station.

Alternatively, the terminal may transmit a second reference signal request signal to the base station using a higher layer signal. In this case, the higher layer signal may be RRC signaling or MAC CE. Alternatively, the terminal may request transmission of the second reference signal from the base station by using control information in a dedicated physical channel. In this case, the dedicated physical channel may be a physical channel dedicated to requesting of the second reference signal.

Accordingly, the base station may receive the second reference signal request signal from the terminal, and may transmit the second reference signal to the terminal based on the second reference signal request signal. Then, the terminal may receive the second reference signal, and may train at least one of the first to third artificial neural networks using the received second reference signal.

Thereafter, the terminal may transmit a training completion report signal to the base station when training of the artificial neural network is completed. Then, the base station may receive the training completion report signal from the terminal. Accordingly, the base station may no longer transmit the second reference signal to the terminal.

Meanwhile, according to an exemplary embodiment of the present disclosure, in the mobile communication system composed of the base station and the terminal, the terminal may configure and utilize an artificial neural network for cancelling interference and/or noise on a channel. The base station may support the first reference signal and the second reference signal augmented for artificial neural network training. In this case, the first reference signal may be a reference signal that may be used for purposes such as data demodulation and/or CSI acquisition. In contrast, the second reference signal may be a reference signal utilized for the purpose of generating data having high cross-correlation to assist the self-supervised learning of the artificial neural network. That is, the second reference signal may be a reference signal indicated for training. As described above in the N2N technique, there may be a pair of data generated by reflecting mutually-independent interferences and/or noises to the same pair of ground truths.

In this case, when the artificial neural network is trained respectively using pieces of data constituting the pair as an input and a target, the artificial neural network can be trained to extract the ground truths existing in the input. In the same principle, two pieces of channel information reflecting mutually-independent interferences and/or noises may be generated as a pair. In this case, the terminal may extract channel information from which interference and/or noise is removed by training the artificial neural network by respectively using the two pieces of channel information constituting the pair as an input and a target. Accordingly, in the present disclosure, the second reference signal for training the artificial neural network for removing interference and/or noise may be configured as a resource obtained by increasing a resource density of the first reference signal by N times in the time and/or frequency domain. As a result, the terminal may extract N pieces of channel information in which mutually-independent interferences and/or noises are reflected. For example, N may be set to 2.

Figure 9:
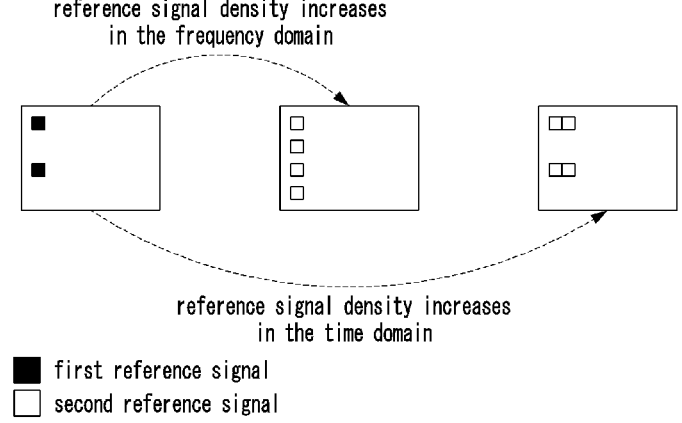
FIG. 9 is a conceptual diagram illustrating a first exemplary embodiment of the second reference signal.

FIG. 9 is a conceptual diagram illustrating a first exemplary embodiment of the second reference signal.

Referring to FIG. 9, the second reference signal may be configured to have twice the density of the first reference signal in the time domain. That is, the second reference signal may have twice the density of the first reference signal in the time domain. Alternatively, the second reference signal may be configured to have twice the density of the first reference signal in the frequency domain. That is, the second reference signal may have twice the density of the first reference signal in the frequency domain. As described above, the second reference signal may be configured to have a resource obtained by increasing the time-domain and/or frequency-domain resource density of the first reference signal by N times. In this case, the base station may generate a sequence for the second reference signal as a single sequence having a length N times that of the first reference signal. Alternatively, the base station may generate a sequence for the second reference signal by generating N sequences having the same length as the first reference signal. When generating the N sequences, the base station may apply different initial values and/or scrambling rules for the respective sequences. In this case, the sequence of the first reference signal and the sequence of the second reference signal may be different from each other.

Meanwhile, according to an embodiment of the present disclosure, in the mobile communication system composed of the base station and the terminal, the terminal may configure and utilize an artificial neural network for cancelling interference and/or noise on a channel. As described above in the N2N technique, there may be a pair of data generated by reflecting mutually-independent interferences and/or noises to the same pair of ground truths. In this case, when the artificial neural network is trained respectively using pieces of data constituting the pair as an input and a target, the artificial neural network can be trained to extract the ground truths existing in the input. In the same principle, two pieces of channel information reflecting mutually-independent interferences and/or noises may be generated as a pair. In this case, the terminal may extract channel information from which interference and/or noise is removed by training the artificial neural network by respectively using the two pieces of channel information constituting the pair as an input and a target.

Accordingly, in the present disclosure, the terminal may divide transmission resources of the training reference signal for the same antenna port into a first subset and a second subset, which are distinguished from each other. In addition, the terminal may use channel information of a channel state estimated based on the training reference signals received through the transmission resources classified as the first subset as an input for the artificial neural network. In addition, the terminal may use channel information of a channel state estimated based on the training reference signals received through the transmission resources classified as the second subset as a target for the artificial neural network. Here, the training reference signal may be the second reference signal, and the artificial neural network to be trained may be one of the first to third artificial neural networks.

Figure 10:
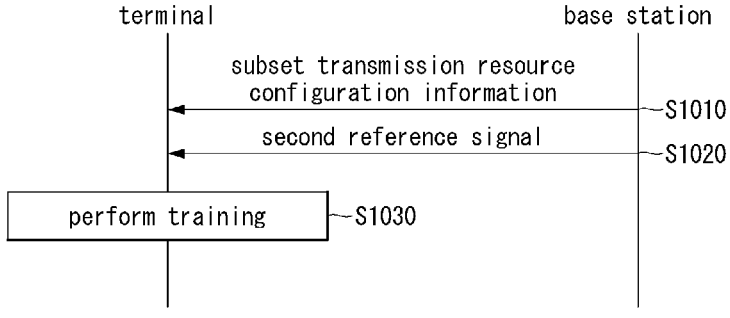
FIG. 10 is a sequence chart illustrating a first exemplary embodiment of a method for training an artificial neural network using reference signals.

FIG. 10 is a sequence chart illustrating a first exemplary embodiment of a method for training an artificial neural network using reference signals.

Referring to FIG. 10, the base station may determine transmission resources for transmitting the second reference signals. Here, the second reference signal may be a training reference signal or a reference signal indicated for training. In this case, the base station may divide the transmission resources for transmitting the second reference signals into transmission resources belonging to a first subset and transmission resources belonging to a second subset. Then, the base station may generate first subset transmission resource configuration information using time resource location information and frequency resource location information of each of the transmission resources belonging to the first subset. In addition, the base station may generate second subset transmission resource configuration information using time resource location information and frequency resource location information of each of the transmission resources belonging to the second subset. Thereafter, the base station may generate subset transmission resource configuration information including the first subset transmission resource configuration information and the second subset transmission resource configuration information, and may transmit the generated subset transmission resource configuration information to the terminal (S1010). Then, the terminal may receive the subset transmission resource configuration information from the base station. For example, the subset transmission resource configuration information of the step S1010 may be included in the second reference signal configuration information of the step S550 of FIG. 5.

Meanwhile, the base station may transmit the second reference signals through the transmission resources belonging to the first subset, and may transmit the second reference signals through the transmission resources belonging to the second subset (S1020). Then, the terminal may receive the second reference signals from the base station through the transmission resources belonging to the first subset, and may receive the second reference signals through the transmission resources belonging to the second subset.

In addition, the terminal may use channel information of a channel state estimated based on the second reference signals received through the transmission resources belonging to the first subset as an input for the artificial neural network. In addition, the terminal may use channel information of a channel state estimated based on the second reference signals received through the transmission resource belonging to the second subset as a target for the artificial neural network. The artificial neural network to be trained may be one of the first to third artificial neural networks.

As described above, the terminal may train the artificial neural network by using the channel information of the channel state estimated based on the second reference signals received through the transmission resources belonging to the first subset as an input for the artificial neural network, and using the channel information of the channel state estimated based on the second reference signals received through the transmission resources belonging to the second subset as a target for the artificial neural network (S1030). The training may be performed by the terminal based on at least one of various training methods proposed in the present disclosure. The artificial neural network to be trained may be one of the first to third artificial neural networks.

Here, it has been described that the base station may divide the transmission resources into the transmission resources belonging to the first subset and the transmission resources belonging to the second subset. However, the terminal may divided the transmission resources into the transmission resources belonging to the first subset and the transmission resources belonging to the second subset. To this end, the base station may determine the transmission resources for transmitting the second reference signals, and may generate transmission resource configuration information using time resource location information and frequency resource location information of the transmission resources for transmitting the second reference signals. Thereafter, the base station may transmit the transmission resource configuration information to the terminal. Then, the terminal may receive the transmission resource configuration information from the base station, and may identify the transmission resources for the second reference signals. In this case, the terminal may divide the transmission resources for the second reference signals into the transmission resources belonging to the first subset and the transmission resources belonging to the second subset.

Figure 11:
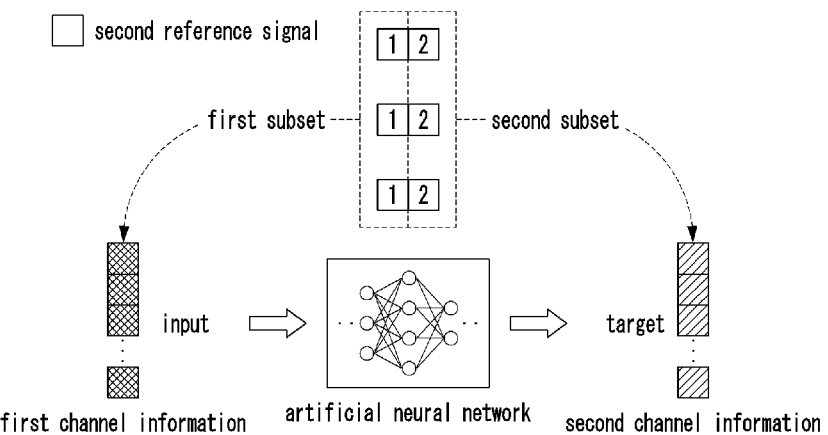
FIG. 11 is a conceptual diagram illustrating a first exemplary embodiment of a method for training an artificial neural network using reference signals.

FIG. 11 is a conceptual diagram illustrating a first exemplary embodiment of a method for training an artificial neural network using reference signals.

Referring to FIG. 11, the base station may transmit the second reference signals through the transmission resources for the second reference signals. Then, the terminal may receive the second reference signals from the base station through the transmission resources. In addition, the terminal may use channel information of a channel state estimated based on the second reference signals received through the transmission resources belonging to the first subset as an input for the artificial neural network. In addition, the terminal may use channel information of a channel state estimated based on the second reference signals received through one the transmission resource belonging to the second subset as a target for the artificial neural network. The artificial neural network to be trained may be one of the first to third artificial neural networks.

As described above, the terminal may train the artificial neural network by using the channel state estimated based on the second reference signals received through the transmission resources belonging to the first subset as an input for the artificial neural network, and using the channel state estimated based on the second reference signals received through the transmission resources belonging to the second subset as a target for the artificial neural network. The artificial neural network to be trained may be one of the first to third artificial neural networks.

As another method, as described above in the N2V technique, data generated by reflecting interference and/or noise may exist in one piece of actual measurement information. Accordingly, the terminal may use modified data obtained by substituting a subset of the data with arbitrary values (e.g., random values) as an input for the artificial neural network. In addition, the terminal may use the data as a target for the artificial neural network. In this case, the terminal may train the artificial neural network by reflecting only a loss for a region corresponding to the subset. In this case, the artificial neural network may be trained to extract the actual measurement information present in the input.

Figure 12:
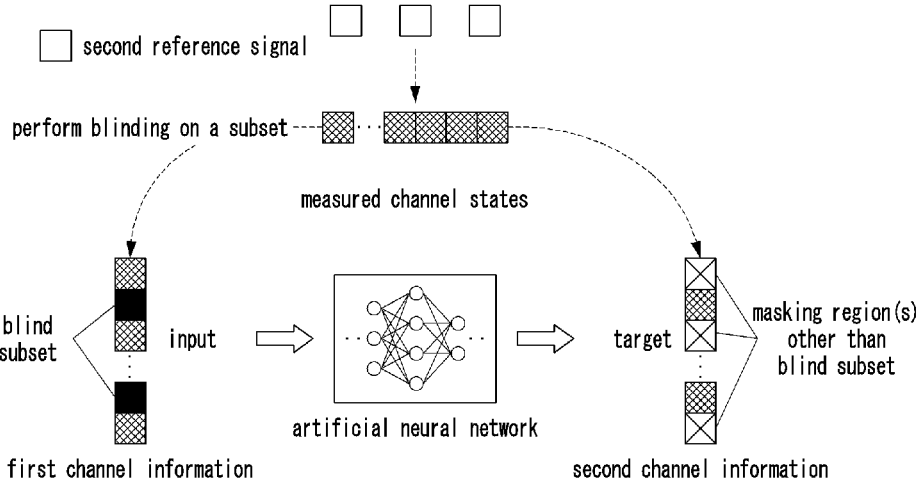
FIG. 12 is a conceptual diagram illustrating a second exemplary embodiment of a method for training an artificial neural network using reference signals.

FIG. 12 is a conceptual diagram illustrating a second exemplary embodiment of a method for training an artificial neural network using reference signals.

Referring to FIG. 12, the base station may transmit the second reference signals through the transmission resources for the second reference signals. Then, the terminal may receive the second reference signals from the base station through the transmission resources. Accordingly, the terminal may estimate a channel state for each of the transmission resources based on the second reference signals received from the base station.

In this case, the terminal may divide the transmission resources for transmitting the second reference signals into transmission resources belonging to one subset and other transmission resources. In addition, the terminal may substitute channel state values for the transmission resources belonging to the subset with arbitrary values (e.g., random values). In this case, the process in which the terminal substitutes the channel state values with arbitrary values may be referred to as 'blinding process'. Accordingly, a blind subset may refer to the subset that has undergone the blinding process in which a part of the estimated channel information is substituted with arbitrary values. In the above-described manner, the terminal may configure channel state values for all the transmission resources, including the channel state values of the transmission resources belonging to the blind subset, as first channel information. The terminal may configure channel state values obtained by masking transmission resources not belonging to the blind subset as second channel information. In this case, the terminal may mask channel state values of the transmission resources not belonging to the subset, thereby setting a loss for the corresponding region to 0.

Meanwhile, the terminal may train the artificial neural network by using the first channel information as an input for the artificial neural network and using the second channel information as a target for the artificial neural network. The artificial neural network to be trained may be one of the first to third artificial neural networks. As described above, by applying masking to a region other than the blind subset, the terminal may reflect only the loss for the blind subset in training of the artificial neural network.

Meanwhile, according to the present disclosure, an artificial neural network for cancelling interference and/or noise on a channel and/or data in the mobile communication system may be configured. Such an artificial neural network may be an interference and noise cancellation artificial neural network. In addition, according to the present disclosure, the artificial neural network for cancelling interference and/or noise on a channel and/or data may be trained. In addition, according to the present disclosure, the artificial neural network for cancelling interference and/or noise on a channel and/or data may be applied to the mobile communication system. The terminal may apply the interference and noise cancellation artificial neural network in units of a physical resource block (PRB) group to which the same transmission technique may be applied.

For example, according to an exemplary embodiment of the present disclosure, in the mobile communication system composed of the base station and the terminal, the terminal may configure, train, and apply the interference and noise cancellation artificial neural network for a downlink channel. When the artificial neural network is applied to a DMRS, channel characteristics thereof may vary depending on a MIMO technique or a precoding technique applied to the DMRS. Therefore, in the present disclosure, when the terminal applies the interference and noise cancellation artificial neural network, the interference and noise cancellation artificial neural network may be applied in units of a PRB group to which the same MIMO technique or precoding technique is pre-promised to be applied between the base station and the terminal.

Meanwhile, according to the present disclosure, an artificial neural network for channel state information feedback in the mobile communication system may be configured, and may be trained using frequency-domain channel information as an input therefor. According to an exemplary embodiment of the present disclosure, in the mobile communication system composed of the base station and the terminal, the terminal may feedback CSI for a downlink channel.

For example, in a CSI encoding and decoding scheme using artificial neural networks, the auto-encoder may be trained using channel information transformed to the time domain. This scheme may be a scheme of transmitting compressed latent variables or codes within the auto-encoder to effectively reproduce the time-domain channel information. On the other hand, the next generation mobile communication system according to exemplary embodiments of the present disclosure may apply the orthogonal frequency division multiplexing (OFDM) scheme. In such an OFDM system, since precoding according to a MIMO technique is applied in the frequency domain, the terminal may perform CSI encoding so as to reproduce frequency-domain channel information more effectively than time-domain channel information. Therefore, in the present disclosure, the terminal may use the frequency-domain channel information as an input for the artificial neural network. In the case, the terminal may use time-domain channel information obtained by applying inverse Fourier transform as an input for an internal artificial neural network. Then, the terminal may apply Fourier transform to an output of the internal artificial neural network to output frequency-domain channel information.

Figure 13:
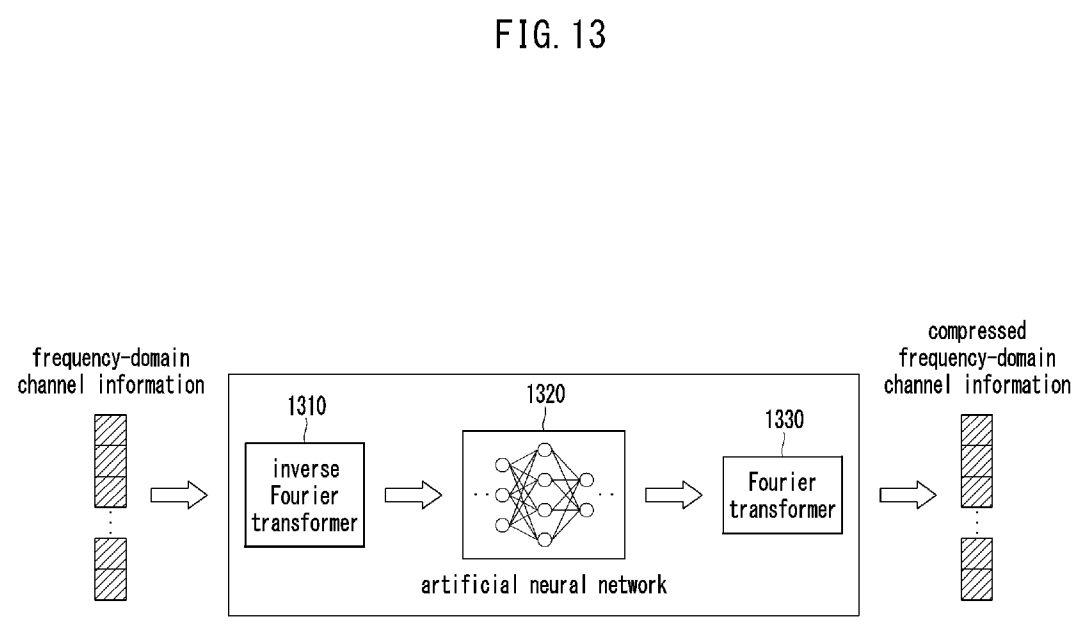

FIG. 13 is a conceptual diagram illustrating a first exemplary embodiment of the channel information generation method of FIG. 5.

Referring to FIG. 13, the base station may transmit a reference signal to the terminal. Here, the reference signal may be a DMRS, CSI-RS, and/or the like. In this case, the base station may transmit a different reference signal for each antenna port. Then, the terminal may estimate a channel state based on the reference signal. In this case, the estimated channel state may be represented as frequency-domain channel information. Accordingly, the terminal may generate time-domain channel information by performing inverse Fourier transform or inverse fast Fourier transform on the frequency-domain channel information through an inverse Fourier transformer 1310. Here, the channel information may be CSI.

In addition, the terminal may use the time-domain channel information obtained by the inverse Fourier transform or inverse fast Fourier transform as an input for an artificial neural network 1320. The artificial neural network 1320 may compress the time-domain channel information and output compressed time-domain channel information. Thereafter, the terminal may transform the compressed time-domain channel information into frequency-domain channel information by performing Fourier transform or fast Fourier transform on the compressed time-domain channel information through a Fourier transformer 1330. The terminal may transmit the frequency-domain channel information to the base station. In this case, the artificial neural network existing in the terminal may be one of the first to third neural network encoders.

Meanwhile, the base station may receive the frequency-domain channel information, and the base station may generate the compressed time-domain channel information by performing inverse Fourier transform or inverse fast Fourier transform on the frequency-domain channel information through an inverse Fourier transformer. Thereafter, the base station may use the compressed time-domain channel information obtained by performing the inverse Fourier transform or inverse fast Fourier transform as an input for an artificial neural network. Then, the artificial neural network of the base station may restore the compressed time-domain channel information and output the time-domain channel information. Thereafter, the base station may transform the time-domain channel information into the frequency-domain channel information by performing Fourier transform or fast Fourier transform on the time-domain channel information through a Fourier transformer. In this case, the artificial neural network existing in the base station may be one of the first to third neural network decoders.

Here, the artificial neural network may be trained using the same signal in the same manner as in the training of the artificial neural networks and the first to third artificial neural networks of FIGS. 5 to 12.

Meanwhile, according to an exemplary embodiment of the present disclosure, in the mobile communication system including the base station and the terminal, the terminal may feedback CSI for a downlink channel to the base station. In the present disclosure, the terminal may use frequency-domain channel information as an input for an internal artificial neural network. In this case, the terminal may use time-domain channel information obtained by performing inverse Fourier transform on frequency-domain channel information as an input for the internal artificial neural network. In addition, the terminal may output frequency-domain channel information by applying Fourier transform to an output of the internal artificial neural network. In this case, the terminal may fix the size of the inverse Fourier transform and/or the size of the Fourier transform by assuming a virtual bandwidth for a frequency-domain channel.

FIG. 14 is a conceptual diagram illustrating a second exemplary embodiment of the channel information generation method of FIG. 5.

Referring to FIG. 14, the base station may transmit a reference signal to the terminal. Here, the reference signal may be a DMRS, CSI-RS, and/or the like. In this case, the base station may transmit a different reference signal for each antenna port. Then, the terminal may estimate a channel state based on the reference signal. In this case, the estimated channel state may be represented as frequency-domain CSI for a virtual bandwidth. That is, it may be frequency-domain channel information estimated with respect to the virtual bandwidth on the assumption that the terminal receives a channel in the virtual bandwidth. Here, the channel information may be CSI.

Accordingly, the terminal may generate time-domain channel information for the virtual bandwidth by performing inverse Fourier transform or inverse fast Fourier transform on the frequency-domain channel information for the virtual bandwidth using an inverse Fourier transformer 1410. In addition, the terminal may use the time-domain channel information for the virtual bandwidth as an input for an artificial neural network 1420. The artificial neural network 1420 may compress the time-domain channel information for the virtual bandwidth, and output compressed time-domain channel information.

Thereafter, the terminal may use a Fourier transformer 1430 to transform the compressed time-domain channel information for the virtual bandwidth into frequency-domain channel information for the virtual bandwidth by performing Fourier transform or fast Fourier transform on the compressed time-domain channel information. Then, the terminal may transmit the frequency-domain channel information for the virtual bandwidth to the base station. In this case, the artificial neural network existing in the terminal may be one of the first to third neural network encoders.

Meanwhile, the base station may receive the frequency-domain channel information for the virtual bandwidth. The base station may generate the compressed time-domain channel information for the virtual bandwidth by performing inverse Fourier transform or inverse fast Fourier transform on the frequency-domain channel information for the virtual bandwidth through an inverse Fourier transformer. Thereafter, the base station may use the compressed time-domain channel information for the virtual bandwidth, which is obtained by the Fourier transform or inverse fast Fourier transform, as an input for the artificial neural network.

Then, the artificial neural network of the base station may restore the compressed time-domain channel information for the virtual bandwidth, and output the time-domain channel information for the virtual bandwidth. Thereafter, the base station may transform the time-domain channel information for the virtual bandwidth into the frequency-domain channel information by performing Fourier transform or fast Fourier transform through a Fourier transformer. In this case, the artificial neural network existing in the base station may be one of the first to third neural network decoders.

Here, the artificial neural network may be trained using the same signal in the same manner as in the training of the artificial neural networks and the first to third artificial neural networks of FIGS. 5 to 12.

For example, an operating bandwidth in which the terminal actually operates may be 20 MHz. In this case, the terminal may configure the virtual bandwidth of the artificial neural network for CSI feedback as 100 MHz. In addition, the terminal may configure channel information of the remaining frequency region excluding the effective 20 MHz frequency region within 100 MHz to 0. When the terminal processes frequency-domain channel information by assuming the virtual bandwidth as described above, the size of the inverse Fourier transform and/or Fourier transform may be fixed based on the virtual bandwidth. Accordingly, there may be an advantage in that a resolution on the time domain is fixed.

In this case, training of the artificial neural network may be performed by configuring frequency-domain channel information as an input and a target in the auto-encoder scheme. In this case, the terminal may not calculate a loss for an ineffective frequency region within the virtual bandwidth. For example, the actual operating bandwidth may be 20 MHz and the virtual bandwidth may be 100 MHz. In this case, a frequency-domain channel within the virtual bandwidth may exist for the effective 20 MHz. A frequency domain channel within the virtual bandwidth may be set to 0 in the remaining region. In this case, the artificial neural network may learn the channel information set to 0 in the ineffective region. Accordingly, the artificial neural network may learn an operation of filtering 20 MHz out of 100 MHz. As a result, the channel information may be distorted in the time domain. For example, a sync function corresponding to a frequency-domain filter may be applied to the channel information in a convolution form.

Accordingly, in the present disclosure, the terminal may train the artificial neural network in the auto-encoder scheme by configuring frequency-domain channel information as an input and a target for the artificial neural network. In this case, the terminal may train the artificial neural network by calculating only loss for an actual effective frequency region within the virtual bandwidth and minimizing the corresponding loss. Specifically, the terminal may always calculate a loss as 0 by applying a masking technique to the frequency region other than the effective frequency region. For example, the actual operating bandwidth may be 20 MHz, and the virtual bandwidth may be set to 100 MHz. In this case, the terminal may assume that the size of the frequency-domain channel information within the 20 MHz band is constant and a phase thereof increases linearly. In this case, when the artificial neural network is trained as proposed in the present disclosure, the artificial neural network may learn a single tap channel that best describes the fixed size and the linearly-increasing phase among time-domain channel information having a resolution of 100 MHz.

Meanwhile, in the present disclosure, when configuring and training an artificial neural network for CSI feedback in the mobile communication system, time-domain channel information obtained by applying an inverse Fourier transform to frequency-domain channel information may be used as an input for the artificial neural network. In this case, the present disclosure may propose a method of extracting time-domain channel information within a delay spread by reflecting a margin due to a synchronization error. However, such a method of reflecting the margin may be a method of circular shifting the time-domain channel information by the margin on the time axis.

Describing this in more detail, according to an exemplary embodiment of the present disclosure, in the mobile communication system composed of the base station and the terminal, the terminal may feedback CSI for a downlink channel. The terminal may use time-domain channel information obtained by applying an inverse Fourier transform to frequency-axis channel information as an input for the artificial neural network. In this case, a channel response may exist within a certain delay spread due to physical characteristics. Utilizing these physical characteristics, the terminal may extract some samples from the front of the time-domain channel information, and use them as an input for the artificial neural network. For example, the time-domain channel information may consist of a total of N samples. In the time-domain channel information, L (<N) samples in the front part may be valid. Therefore, the terminal may exclude the remaining (N-L) samples by expecting that there is no channel information. Here, N and L may be positive integers. However, in a commercial environment, the terminal may cause a synchronization error because it cannot accurately know time-domain synchronization.

For example, in an OFDM system to which a cyclic prefix (CP) is applied, a synchronization time recognized by the terminal (i.e., application time of Fourier transform) may be delayed by D samples from the first delay time of a channel path. In this case, the channel response may be seen as a form circularly-shifted by D in a negative direction on the time axis. In this case, a part of the channel response may exist in the ending sample(s) of the total N samples. In this case, when the terminal extracts samples assuming that only the L (<N) samples in the front part are valid, a channel distortion problem may occur.

Accordingly, the present disclosure may propose a method of extracting time-domain channel information within a delay spread by reflecting a margin due to a synchronization error. Specifically, after acquiring synchronization and obtaining time-domain channel information, the terminal may cyclically shift the time-domain channel information by an error margin on the time axis. Then, the terminal may extract a front part of the time-domain channel information, which corresponds to the delay spread.

Meanwhile, in the mobile communication system according to the present disclosure, the terminal may configure and train an artificial neural network for cancelling interference and/or noise on a channel. In this case, the present disclosure may propose a method for the terminal to request transmission of a training resource for the interference cancellation artificial neural network from the base station.

Describing the above in more detail, according to an exemplary embodiment of the present disclosure, in the mobile communication system composed of the base station and the terminal, the terminal may configure and utilize an artificial neural network for cancelling interference and/or noise on a channel. As an example of the artificial neural network technique for cancelling interference and/or noise on a channel, a DnCNN model may be applied. However, when training the DnCNN model, the supervised learning scheme may use an ideal channel from which interference and/or noise is removed as actual measurement information. Such the supervised learning scheme may be difficult to apply in a commercial mobile communication environment in which ideal channel information cannot be obtained.

Accordingly, the base station and the terminal may apply the self-supervised learning scheme to train relationships between data as the unsupervised learning scheme rather than the supervised learning scheme. In addition, the base station and the terminal may consider a scheme of supporting online learning for the artificial neural network by applying such the self-supervised learning. However, the self-supervised learning scheme may be applied only when pieces of data with high cross-correlation are collected. Therefore, in the present disclosure, when the terminal configures and trains the artificial neural network for cancelling interference and/or noise on a channel, the terminal may request transmission of resources for training the interference cancellation artificial neural network from the base station. For example, when receiving the request for transmission of resources for training the interference cancellation artificial neural network from the terminal, the base station may transmit a signal having allocated resources with a high cross-correlation therebetween to the terminal.

Meanwhile, when the terminal configures and trains the artificial neural network for cancelling interference and/or noise on a channel, the terminal may transmit time-domain and/or frequency-domain channel correlation-related information to the base station. In this case, the correlation-related information may include the following.

(1) Information on a coherence time, which is a time period in which static/uniform characteristics of the channel are maintained (2) Information on a coherent bandwidth, which is a frequency region in which static/uniform characteristics of the channel are maintained (3) Doppler information (4) Delay spread information Describing the above in more detail, according to an exemplary embodiment of the present disclosure, in the mobile communication system composed of the base station and the terminal, the terminal may configure and utilize an artificial neural network for cancelling interference and/or noise on a channel. In this case, as one of unsupervised learning techniques, the base station and the terminal may apply the self-supervised learning scheme of training the relationship between data to support online learning of the artificial neural network. Specifically, a pair of data may be generated by reflecting mutually-independent interferences and/or noises to the same pair of ground truths. In this case, the terminal may train the artificial neural network in the self-supervised scheme by using the respective data constituting the pair as an input and a target for the artificial neural network. In this case, the artificial neural network may be trained by extracting the ground truths present in the input. To support such the self-supervised learning, data with high cross-correlation may be secured between allocated resources.

To this end, the base station may transmit a signal having allocated resource with a high cross-correlation therebetween. However, it may be difficult for the base station to determine how to construct the signal on the time domain and/or frequency domain so that the terminal can regard it as a signal having high channel correlation. Accordingly, in the present disclosure, the terminal may report time-domain and/or frequency-domain channel correlation related information to the base station. Thereafter, the base station may efficiently configure and transmit a signal having a high cross-correlation between allocated resources when received by the terminal based on the channel correlation related information. For example, when the base station knows information on a coherence time of the terminal, the base station may transmit a reference signal in a plurality of symbols within the coherence time in the time domain, so that a high degree of correlation between the plurality of symbols can be maintained.

Meanwhile, the base station may transmit information on a co-location relationship between reference signal resources that are distinguished from each other in the time domain and/or the frequency domain to the terminal. Here, the co-location relationship may mean that different resources are transmitted through a physically-identical channel. However, typically, the reference signal resources may not exist within the same scheduling unit, slot, or resource block (RB).

Describing the above in more detail, the base station may transmit reference signal resources that are distinguished from each other in the time domain and/or the frequency domain to the terminal through the same channel. In this case, the reference signal resources may have sufficiently high correlation from the point of view of the terminal. Then, the terminal may use the reference signal resources as data for training of the correlations. Accordingly, in the present disclosure, the base station may transmit information on a co-location relationship between the reference signal resources that are distinguished from each other in the time axis and/or frequency axis to the terminal. For example, in the next-generation mobile communication system, a channel may be maintained within a scheduling unit. When the proposed method of the present disclosure is applied, the base station may inform the terminal that reference signal resources transmitted in different slots physically experience the same channel. In this case, when it is determined that the reference signal resources have a high cross-correlation, the terminal may proceed with the training of the interference cancellation artificial neural network by respectively configuring the reference signal resources as the input and the target therefor.

Figure 15:
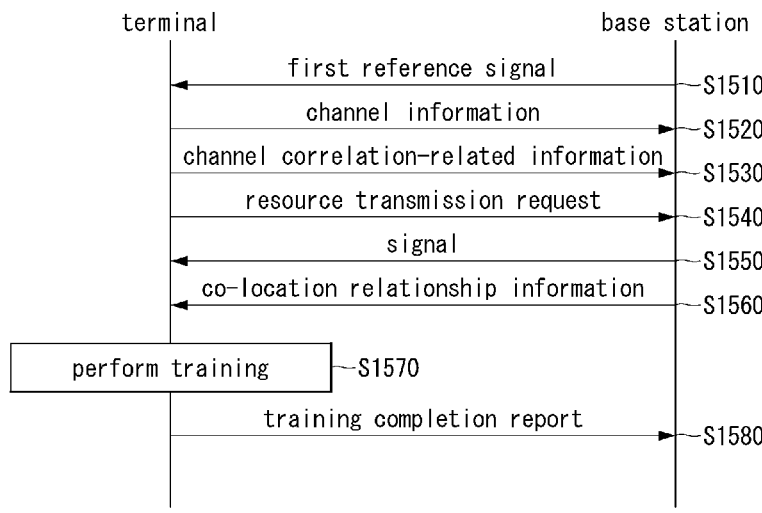
FIG. 15 is a sequence chart illustrating a third exemplary embodiment of a channel information transmission method in a communication system.

FIG. 15 is a sequence chart illustrating a third exemplary embodiment of a channel information transmission method in a communication system.

Referring to FIG. 15, the base station may transmit the first reference signal to the terminal (S1510). Here, the first reference signal may be a DMRS, CSI-RS, and/or the like. In this case, the base station may transmit a different first reference signal for each antenna port. Then, the terminal may receive the first reference signal from the base station, and generate channel information by estimating a channel state using at least one of the first to third neural network encoders. Here, the channel information may be CSI. In addition, the terminal may compress the channel information using at least one of the first to third neural network encoders, and transmit the compressed channel information to the base station (S1520). Then, the base station may receive the compressed channel information, and may infer the channel state by restoring the compressed channel information using at least one of the first to third neural network decoders.

Thereafter, the terminal may transmit correlation-related information to the base station (S1530). Then, the base station may receive the correlation related information from the terminal. In addition, the terminal may transmit a resource transmission request signal requesting transmission of a resource to the base station (S1540). In this case, the terminal may transmit the resource transmission request signal to the base station using a higher layer signal. Here, the higher layer signal may be RRC signaling or MAC CE. Alternatively, the terminal may request transmission of a resource from the base station when reporting control information. Alternatively, the terminal may include resource transmission request information in a dedicated physical channel, and transmit it to the base station. For example, the terminal may transmit the resource transmission request information to the base station through a physical channel dedicated to the resource transmission request.

The base station may receive the resource transmission request signal from the terminal. Then, the base station may transmit a signal having allocated resources with a high cross-correlation therebetween to the terminal based on the resource transmission request signal from the terminal (S1550). Then, the terminal may receive the signal having a high cross-correlation between allocated resources. In addition, the base station may transmit information on a co-location relationship information between reference signal resources that are distinguished from each other in the time domain and/or the frequency domain to the terminal (S1560). In this case, the terminal may receive the information on the co-location relationship from the base station. When it is determined that the reference signal resources have a high cross-correlation based on the information on the co-location relationship, the terminal may proceed with the training of the interference cancellation artificial neural network by configuring the reference signal resources as the input and the target, respectively.

In this case, the terminal may train at least one of the first to third artificial neural networks using the received signal having a high cross-correlation between allocated resources (S1570). Thereafter, the terminal may transmit a training completion report signal to the base station (S1580). Accordingly, the base station may receive the training completion report signal from the terminal, and the base station may stop transmitting the signals to the terminal.

On the other hand, the base station may configure the terminal to report information on whether or not to apply the interference cancellation artificial neural network when configuring CSI feedback reporting of the terminal. For example, the terminal may support the interference cancellation artificial neural network. In this case, the base station may control whether to apply the interference cancellation artificial neural network according to a preference of a scheduler. In this case, in order for the base station to determine whether to apply the interference cancellation artificial neural network, it may be necessary to predict performance improvement when the interference cancellation artificial neural network is applied. Therefore, the base station may configure the terminal to report information on whether or not to apply the interference cancellation artificial neural network when configuring CSI feedback reporting of the terminal.

Figure 16:
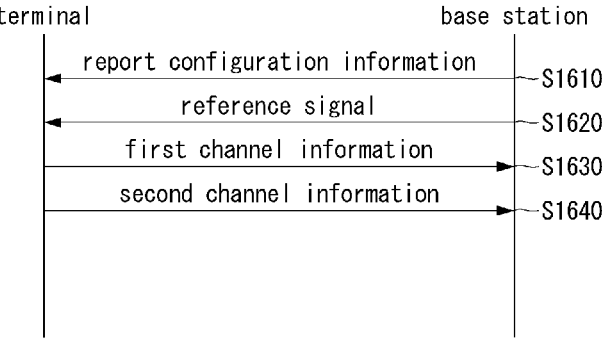
FIG. 16 is a sequence chart illustrating a fourth exemplary embodiment of a channel information transmission method in a communication system.

FIG. 16 is a sequence chart illustrating a fourth exemplary embodiment of a channel information transmission method in a communication system.

Referring to FIG. 16, the base station may generate report configuration information for configuring the terminal to report channel information in the conventional manner and/or report channel information in the manner to which the interference cancellation artificial neural network is applied. Then, the base station may transmit the report configuration information to the terminal (S1610). Then, the terminal may receive the report configuration information from the base station. Accordingly, the terminal may recognize a need to report the channel information in the conventional manner and a need to report the channel information in the manner to which the interference cancellation artificial neural network is applied.

Thereafter, the base station may transmit a reference signal to the terminal (S1620). Here, the reference signal may be a DMRS, CSI-RS, and/or the like. In this case, the base station may transmit a different reference signal for each antenna port. The terminal may receive the reference signal from the base station, and generate first channel information by estimating a channel state in the conventional manner. The terminal may transmit the first channel information generated in the conventional manner to the base station (S1630).

In this case, the terminal may transmit, to the base station, notification information notifying the base station that the first channel information is channel information for a channel for which the interference cancellation artificial neural network is not used. Accordingly, the base station may receive the first channel information configured in the conventional manner from the terminal. In addition, the base station may receive, from the terminal, the notification information notifying that the first channel information is channel information for a channel for which the interference cancellation artificial neural network is not used. Accordingly, the base station may recognize the first channel information as channel information for a channel for which the interference cancellation artificial neural network is not used.

Meanwhile, the terminal may generate channel information by estimating a channel state of a channel from which interference or noise is removed using the interference cancellation artificial neural network. In addition, the terminal may transmit, to the base station, the channel information generated for the channel from which interference or noise is removed by applying the interference cancellation artificial neural network as second channel information (S1640). In this case, the terminal may transmit, to the base station, notification information notifying the base station that the second channel information is channel information for the channel from which interference or noise is removed using the interference cancellation artificial neural network.

The base station may receive the second channel information, and may infer the channel state from the second channel information. In addition, the base station may receive the notification information notifying that the second channel information is channel information for the channel to which the interference cancellation artificial neural network is applied from the terminal. Accordingly, the base station may recognize the second channel information as the channel information for the channel for which the interference cancellation artificial neural network is used. As a result, the base station may know a difference between the channel information obtained by using the interference cancellation artificial neural network and the channel information obtained without using the interference cancellation artificial neural network. Here, it has been described that the terminal transmits two pieces of channel information to the base station, but the terminal may transmit information on the difference between the first channel information and the second channel information. The base station may receive the information on the difference between the first channel information and the second channel information from the terminal, and may obtain the second channel information from the first channel information and the information on the difference.

Meanwhile, the terminal may provide one or more of the following additional information as an additional input during the training process of the interference cancellation artificial neural network and/or the channel state inference process.

(1) Channel estimation type

A. When the channel estimation scheme is classified into the lease square (LS) scheme or the minimum mean square error (MMSE) scheme, an identifier for identifying the channel estimation type (2) Interference level and/or noise level A. Information on variance(s) for interference and/or noise level (3) Reception sensitivity information Reception sensitivity information such as a reference signal received power (RSRP), received signal strength indicator (RSSI), and reference signal received quality (RSRQ)

(4) Frequency resource information

Location information of frequency resources located in the current channel

As described above, the interference cancellation artificial neural network may increase the accuracy of training and reasoning by utilizing additional information capable of specifying interference and/or noise characteristics in addition to the channel information during the training process and/or channel information inference process. In this case, the base station may generate report configuration information including information of the identifier for identifying the channel estimation type, information indicative of utilizing the variance(s) of the interference and/or noise level, information indicative of utilizing the reception sensitivity, information indicative of utilizing of frequency resources, and the like. The base station may transmit the report configuration information to the terminal. Then, the terminal may receive the report configuration information from the base station, and utilize the additional information according to the received report configuration information for the interference cancellation artificial neural network.

Figure 17:
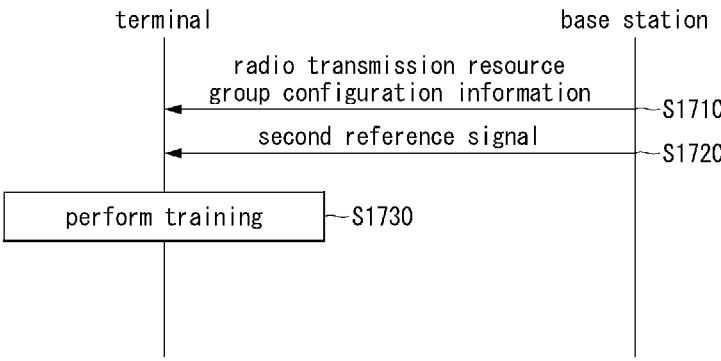
FIG. 17 is a conceptual diagram illustrating a third exemplary embodiment of a method for training an artificial neural network using reference signals.

FIG. 17 is a conceptual diagram illustrating a third exemplary embodiment of a method for training an artificial neural network using reference signals.

Referring to FIG. 17, the base station may determine transmission resources for transmitting the second reference signals. In this case, the base station may divide the transmission resources for transmitting the second reference signals into transmission resources belonging to a first radio transmission resource group and transmission resources belonging to a second radio transmission resource group. In addition, the base station may generate first radio transmission resource group configuration information using time resource location information and frequency resource location information of each of the transmission resources belonging to the first radio transmission resource group. In addition, the base station may generate second radio transmission resource group configuration information using time resource location information and frequency resource location information of each of the transmission resources belonging to the second radio transmission resource group. Thereafter, the base station may generate radio transmission resource group configuration information including the first radio transmission resource group configuration information and the second radio transmission resource group configuration information. The base station may transmit the generated radio transmission resource group configuration information to the terminal (S1710). Then, the terminal may receive the radio transmission resource group configuration information from the base station.

Meanwhile, the base station may transmit the second reference signals through the transmission resources belonging to the first radio transmission resource group, and may transmit the second reference signals through the transmission resources belonging to the second radio transmission resource group (S1720). The terminal may receive the second reference signals from the base station through the transmission resources belonging to the first radio transmission resource group, and may receive the second reference signals through the transmission resources belonging to the second radio transmission resource group.

The base station may transmit the second reference signals through the transmission resources for the second reference signals. The terminal may receive the second reference signals from the base station through the transmission resources. In addition, the terminal may use a first channel state estimated based on the second reference signals received through the transmission resources belonging to the first radio transmission resource group as an input for an artificial neural network. In addition, the terminal may use a second channel state estimated based on the second reference signals received through the transmission resources belonging to the second radio transmission resource group as a target for the artificial neural network. The artificial neural network may be an artificial neural network for CSI feedback.

As described above, the terminal may train the artificial neural network by using the first channel state estimated based on the second reference signals received through the transmission resources belonging to the first radio transmission resource group as the input for the artificial neural network, and using the second channel state estimated based on the second reference signals received through the transmission resources belonging to the second radio transmission resource group as the target for the artificial neural network (S1730). The artificial neural network may be the artificial neural network for CSI feedback.

Here, the first and second channel information may be in an explicit form for the radio channel. Alternatively, the first and second channel information may be information obtained by processing information on the radio channel. Here, the information obtained by processing the information on the radio channel may be, for example, an eigenvector of the channel.

Here, the base station may divide the transmission resources into the transmission resources belonging to the first radio transmission resource group and the transmission resources belonging to the second radio transmission resource group. However, unlike the above-described approach, the terminal may divide the transmission resources into the transmission resources belonging to the first radio transmission resource group and the transmission resources belonging to the second radio transmission resource group. To this end, the base station may determine the transmission resources for transmitting the second reference signals, and may generate transmission resource configuration information using time resource location information and frequency resource location information of each of the transmission resources for transmitting the second reference signals. Thereafter, the base station may transmit the transmission resource configuration information to the terminal. The terminal may receive the transmission resource configuration information from the base station, and may identify the transmission resources for the second reference signals. In this case, the terminal may divide the transmission resources for the second reference signals into the transmission resources belonging to the first radio transmission resource group and the transmission resources belonging to the second radio transmission resource group.

The base station may transmit the second reference signals through the transmission resources for the second reference signals. Then, the terminal may receive the second reference signals from the base station through the transmission resources. In addition, the terminal may use the first channel state estimated based on the second reference signals received through the transmission resources belonging to the first radio transmission resource group as an input for an artificial neural network. In addition, the terminal may use the second channel state estimated based on the second reference signals received through the transmission resources belonging to the second radio transmission resource group as a target for the artificial neural network. The artificial neural network may be an artificial neural network for CSI feedback.

As described above, the terminal may train the artificial neural network by using the first channel state estimated based on the second reference signals received through the transmission resources belonging to the first radio transmission resource group as the input for the artificial neural network, and using the second channel state estimated based on the second reference signals received through the transmission resources belonging to the second radio transmission resource group as the target for the artificial neural network.

Meanwhile, the base station and the terminal may each configure an artificial neural network for CSI feedback. In addition, the base station and the terminal may train the artificial neural networks for CSI feedback by utilizing a mutually shared data set. For example, the base station may first train the artificial neural network for CSI feedback in the base station by utilizing CSIs. The base station may deliver some or all of the CSIs to the terminal.

Then, the terminal may train the artificial neural network for CSI feedback by utilizing the CSIs received from the base station. In this case, the base station and the terminal may train the artificial neural networks for CSI feedback in the auto-encoder scheme in which the same CSI is used as an input and a target. Alternatively, the base station and the terminal may train the artificial neural networks for CSI feedback by using the N2N technique in the auto-encoder scheme in which channel information constituting a pair, which are highly correlated but distinguished from each other, are respectively used as an input and a target. Accordingly, when exchanging the CSIs for training the artificial neural networks for CSI feedback, the base station and the terminal may configure and exchange the CSIs in one or more of the following schemes.

(1) Scheme 1

The base station may configure the CSIs for training the artificial neural networks as single CSI that is equally applied as an input and a target for training the artificial neural networks, and transmit it to the terminal. For example, the base station may configure the CSI as single CSI to be configured as an input and a target during training of the artificial neural networks, and transmit it to the terminal.

(2) Scheme 2

The base station may configure the CSIs for training the artificial neural networks as a pair of CSIs which are respectively applied as an input and a target for training of the artificial neural networks, and transmit the pair of CSIs to the terminal. For example, the base station may configure a pair of CSIs, that is, first CSI configured as an input during the artificial neural network training and second CSI configured as a target during the artificial neural network training, and transmit the same to the terminal.

Figure 18:
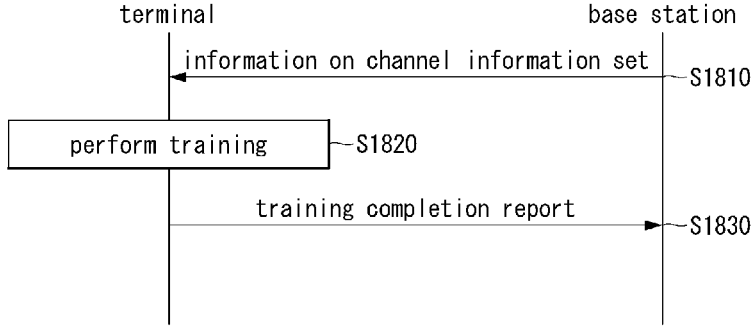
FIG. 18 is a conceptual diagram illustrating a fourth exemplary embodiment of an artificial neural network training method using reference signals.

FIG. 18 is a conceptual diagram illustrating a fourth exemplary embodiment of an artificial neural network training method using reference signals.

Referring to FIG. 18, the base station may several pieces of channel information, and generate a channel information set with the several pieces of channel information. In this case, the channel information set may include first channel information and second channel information. The base station may transmit information on the channel information set to the terminal (S1810). The terminal may receive the information on the channel information set from the terminal, and accordingly, the terminal may identify the first channel information and the second channel information.

Thereafter, the terminal may train an artificial neural network by using the first channel information as an input for the artificial neural network, and using the first channel information as a target for the artificial neural network (S1820). Alternatively, the terminal may train the artificial neural network by using the first channel information as an input for the artificial neural network, and using the second channel information as a target for the artificial neural network. Then, the terminal may report completion of the training to the base station (S1830). Accordingly, the base station may receive a training completion report signal from the terminal.

Meanwhile, during the training process for the interference cancellation artificial neural network and/or the inference process using the interference cancellation artificial neural network, the terminal may need the second reference signal for training the artificial neural network, which follows a specific resource allocation scheme compared to the first reference signal. Accordingly, the terminal may request transmission of the second reference signal from the base station.

In this case, the terminal may deliver, to the base station, configuration information of the required second reference signal or information on whether the second reference signal is needed. The terminal may report information on an augmented reference signal or training reference signal commonly applied to artificial neural network models to the base station. Alternatively, the terminal may report information on an augmented reference signal or training reference signal applied to a part of the artificial neural network models to the base station. Alternatively, the terminal may report information on an augmented reference signal or training reference signal for each artificial neural network model to the base station.

That is, in addition to the first reference signal, the terminal may report information on an augmented reference signal or training reference signal for assisting configuration and training of the artificial neural network to the base station in one or more of the following schemes.

(1) The terminal reports information on an augmented reference signal or training reference signal, which is commonly applied for artificial neural network models, to the base station.

(2) The terminal reports information on an augmented reference signal or training reference signal, which is applied to a part of the artificial neural network models, to the base station. The information includes identifier(s) of the part of the artificial neural network models.

(3) The terminal reports information on augmented reference signal or training reference signal for each artificial neural network model to the base station.

Figure 19:
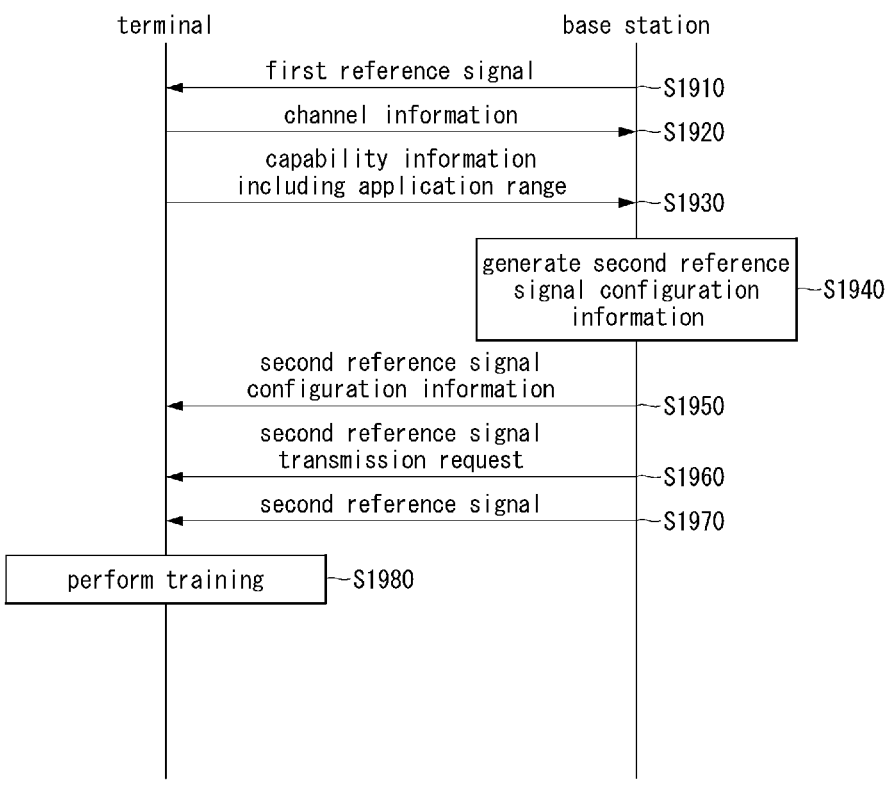
FIG. 19 is a conceptual diagram illustrating a fifth exemplary embodiment of a method for training an artificial neural network using reference signals.

FIG. 19 is a conceptual diagram illustrating a fifth exemplary embodiment of a method for training an artificial neural network using reference signals.

Referring to FIG. 19, the base station may transmit the first reference signal to the terminal (S1910). Here, the first reference signal may be a DMRS, CSI-RS, and/or the like. In this case, the base station may transmit a different first reference signal for each antenna port. Then, the terminal may receive the first reference signal from the base station, and generate channel information by estimating a channel state using at least one of the first to third neural network encoders. Then, the terminal may compress the channel information using at least one of the first to third neural network encoders, and transmit the compressed channel information to the base station (S1920). The base station may receive the compressed channel information, and may infer the channel state by restoring the compressed channel information using at least one of the first to third neural network decoders.

Meanwhile, the terminal may generate capability information related to the second reference signal. Here, the second reference signal may be an augmented reference signal or a reference signal indicated for training. For example, the terminal may generate the capability information including information on whether the second reference signal is used in all or part of the first to third artificial neural networks and information on whether the second reference signal is needed. That is, the capability information may include the information on whether the second reference signal is used in all or part of the first to third artificial neural networks and the information on whether the second reference signal is needed.

Alternatively, the terminal may generate capability information including information on a transmission periodicity required for the second reference signal in all or part of the first to third artificial neural networks. That is, the capability information may include information on a transmission periodicity required for the second reference signal in all or part of the first to third artificial neural networks. Alternatively, the terminal may generate capability information including information on transmission resources required for the second reference signal in all or part of the first to third artificial neural networks. That is, the capability information may include the information on transmission resources for the second reference signal in all or part of the first to third artificial neural networks.

In addition, the terminal may transmit the capability information related to the second reference signal for all or part of the first to third artificial neural networks to the base station. In this case, the capability information may include application range information indicating that the information related to the second reference signal is commonly applied to the first to third artificial neural networks. Alternatively, the capability information may include application range information including information on identifier(s) of some artificial neural networks of the first to third artificial neural networks when the information related to the second reference signal is applied to the some of the first to third artificial neural networks.

Accordingly, the base station may receive the capability information related to the second reference signal for all or part of the first to third artificial neural networks from the terminal. In this case, the capability information received from the terminal by the base station may include the application range information. Accordingly, the base station may determine the application range of the information related to the second reference signal based on the application range information. For example, the base station may determine that the information related to the second reference signal is commonly applied to the first to third artificial neural networks based on the application range information. Alternatively, the base station may determine that the information related to the second reference signal is applied to some of the first to third artificial neural networks based on the application range information. In this case, the base station may recognize identifier(s) for the some of the first to third artificial neural networks, to which the information related to the second reference signal is applied.

In addition, the base station may determine whether to transmit the second reference signal based on the capability information related to the second reference signal for all or part of the first to third artificial neural networks received from the terminal. In this case, the base station may determine whether to transmit the second reference signal for all or part of the first to third artificial neural networks. For example, the base station may determine that transmission of the second reference signal is necessary when the terminal uses the second reference signal. Alternatively, the base station may determine that transmission of the second reference signal is necessary when the terminal needs to use the second reference signal. On the other hand, the base station may determine that transmission of the second reference signal is not necessary when the terminal does not use the second reference signal. Alternatively, the base station may determine that transmission of the second reference signal is not necessary when the terminal does not need to use the second reference signal.

In addition, the base station may determine a transmission periodicity of the second reference signal based on the required transmission periodicity included in the capability information. In this case, the base station may determine the transmission periodicity of the second reference signal for all or part of the first to third artificial neural networks. In addition, the base station may determine transmission resources of the second reference signal based on the required transmission resources included in the capability information. In this case, the base station may determine the transmission resources of the second reference signal for all or part of the first to third artificial neural networks.

Meanwhile, the base station may configure the second reference signal for training at least one of the first to third artificial neural networks. Here, configuration of the second reference signal may include configuration of a transmission time of the second reference signal. In this case, the base station may configure candidate transmission times by configuring multiple transmission times of the second reference signal. The base station may configure the candidate transmission times of the second reference signal as a transmission time candidate group.

The base station may generate information on the configuration of the second reference signal (S1940). That is, the base station may generate second reference signal configuration information. In this case, the base station may generate transmission time configuration information of the second reference signal. Alternatively, the base station may generate transmission time candidate group configuration information of the second reference signal. Accordingly, the base station may generate second reference signal configuration information including the transmission time configuration information of the second reference signal. Alternatively, the base station may generate second reference signal configuration information including the transmission time candidate group configuration information of the second reference signal.

In this case, the second reference signal configuration information may include application range information indicating that the second reference signal is commonly applied to the first to third artificial neural networks. Alternatively, the second reference signal configuration information may include application range information including information of identifier(s) of some of the first to third artificial neural networks when the second reference signal is applied to the some of the first to third artificial neural networks.

The base station may transmit the second reference signal configuration information including the transmission time configuration information and application range information of the second reference signal to the terminal (S1950). In this case, the base station may transmit the second reference signal configuration information to the terminal using a higher layer signal. Here, the higher layer signal may be RRC signaling or MAC CE. Alternatively, the base station may transmit the second reference signal configuration information to the terminal using a dynamic control signal. Here, the dynamic control signal may be DCI.

Then, the terminal may receive the second reference signal configuration information including the transmission time configuration information and application range information of the second reference signal from the base station. The terminal may obtain the transmission time configuration information of the second reference signal from the second reference signal configuration information. In this case, when receiving the second reference signal configuration information through the MAC CE, the terminal may apply the corresponding configuration after a specific number of slots promised with the base station from a reception time of the MAC CE. In addition, the terminal may identify the application range of the second reference signal from the second reference signal configuration information.

Thereafter, the terminal may transmit a second reference signal request signal requesting transmission of the second reference signal to the base station (S1960). In this case, the terminal may transmit the second reference signal request signal to the base station using a higher layer signal. Here, the higher layer signal may be RRC signaling or MAC CE. Alternatively, the terminal may request the base station to transmit the second reference signal when reporting control information. Alternatively, the terminal may include second reference signal request information in a dedicated physical channel and transmit it to the base station. For example, the terminal may transmit the second reference signal request information to the base station through the physical channel dedicated to the second reference signal request.

In the above-described situation, the terminal may request transmission of the second reference signal for all of the first to third artificial neural networks. Alternatively, the terminal may request transmission of the second reference signal for a part of the first to third artificial neural networks. Alternatively, the terminal may request transmission of the second reference signal for one of the first to third artificial neural networks. Then, the base station may receive a second reference signal request signal for all or part of the first to third artificial neural networks from the terminal. Alternatively, the base station may receive a second reference signal request signal for one of the first to third artificial neural networks from the terminal.

Thereafter, the base station may transmit the second reference signal to the terminal based on the second reference signal request signal (S1980). The base station may transmit the second reference signal to the terminal at a transmission time according to the transmission time configuration information of the second reference signal based on the reference signal request signal received from the terminal. In this case, the base station may transmit the second reference signal to the terminal even when there is no data.

In this case, the base station may transmit the second reference signal for all of the first to third artificial neural networks to the terminal when the terminal requests transmission of the second reference signal for all of the first to third artificial neural networks. Alternatively, the base station may transmit the second reference signal for a part of the first to third artificial neural networks to the terminal when the terminal requests transmission of the second reference signals for the some of the first to third artificial neural networks. Alternatively, the base station may transmit the second reference signal for one of the first to third artificial neural networks when the terminal requests transmission of the second reference signal for the one of the first to third artificial neural networks.

Then, the terminal may receive the second reference signal at the transmission time of the second reference signal according to the second reference signal configuration information. Then, the terminal may train at least one of the first to third artificial neural networks corresponding to the application range information using the received second reference signal (S1970).

Meanwhile, the terminal may generate capability information including information on whether or not the second reference signal is used and required in each of the first to third artificial neural networks. That is, the capability information may include information on whether the second reference signal is used in each of the first to third artificial neural networks and information on whether or not the second reference signal is needed in each of the first to third artificial neural networks. Alternatively, the terminal may generate the capability information including a transmission periodicity required for the second reference signal in each of the first to third artificial neural networks. That is, the capability information may include a required transmission periodicity required for the second reference signal in each of the first to third artificial neural networks.

Alternatively, the terminal may generate the capability information including information on a transmission resource required for the second reference signal in each of the first to third artificial neural networks. That is, the capability information may include information on the transmission resource required for the second reference signal in each of the first to third artificial neural networks.

The terminal may transmit capability information related to the second reference signal for each of the first to third artificial neural networks to the base station. Accordingly, the base station may receive the capability information related to the second reference signal for each of the first to third artificial neural networks from the terminal. In addition, the base station may determine whether to transmit the second reference signal based on the capability information related to the second reference signal for each of the first to third artificial neural networks received from the terminal.

In this case, the base station may determine whether or not to transmit the second reference signal for each of the first to third artificial neural networks. In addition, the base station may determine a transmission periodicity of the second reference signal based on the required transmission periodicity included in the capability information. In this case, the base station may determine the transmission periodicity of the second reference signal for each of the first to third artificial neural networks. In addition, the base station may determine a transmission resource of the second reference signal based on the required transmission resources included in the capability information. In this case, the base station may determine the transmission resource of the second reference signal for each of the first to third artificial neural networks.

Meanwhile, the base station may configure the second reference signal for training of each of the first to third artificial neural networks. Here, configuration of the second reference signal may include configuration of a transmission time of the second reference signal for each of the first to third artificial neural networks. In this case, the base station may configure candidate transmission times by configuring multiple transmission times of the second reference signal for each of the first to third artificial neural networks. In addition, the base station may configure the candidate transmission times of the second reference signal for each of the first to third artificial neural networks as a transmission time candidate group.

The base station may generate information on configuration of the second reference signal for each of the first to third artificial neural networks. That is, the base station may generate second reference signal configuration information for each of the first to third artificial neural networks. In this case, the base station may generate transmission time configuration information of the second reference signal for each of the first to third artificial neural networks.

Alternatively, the base station may generate transmission time candidate group configuration information of the second reference signal for each of the first to third artificial neural networks. Accordingly, the base station may generate the second reference signal configuration information including the transmission time configuration information of the second reference signal for each of the first to third artificial neural networks. Alternatively, the base station may generate the second reference signal configuration information including the transmission time candidate group configuration information of the second reference signal for each of the first to third artificial neural networks.

The base station may transmit second reference signal configuration information including the transmission time configuration information of the second reference signal for each of the first to third artificial neural networks to the terminal. In this case, the base station may transmit the second reference signal configuration information to the terminal using a higher layer signal. Here, the higher layer signal may be RRC signaling or MAC CE. Alternatively, the base station may transmit the second reference signal configuration information to the terminal using a dynamic control signal. Here, the dynamic control signal may be DCI.

Then, the terminal may receive the second reference signal configuration information including the transmission time configuration information of the second reference signal for each of the first to third artificial neural networks from the base station. The terminal may obtain the transmission time configuration information of the second reference signal for each of the first to third artificial neural networks from the second reference signal configuration information.

Thereafter, the terminal may transmit a second reference signal request signal requesting transmission of the second reference signal to the base station. In this situation, the terminal may request transmission of the second reference signal for one of the first to third artificial neural networks. Then, the base station may receive the second reference signal request signal for one of the first to third artificial neural networks from the terminal.

Thereafter, the base station may transmit the second reference signal to the terminal based on the second reference signal request signal. The base station may transmit the second reference signal to the terminal at a transmission time according to the transmission time configuration information of the second reference signal based on the reference signal request signal received from the terminal. In this case, the base station may transmit the second reference signal to the terminal even when there is no data. In this case, the base station may transmit the second reference signal for one of the first to third artificial neural networks when the terminal requests transmission of the second reference signal for the one of the first to third artificial neural networks.

In the above-described situation, the base station may transmit the requested second reference signal to the terminal at a transmission time according to the transmission time configuration information of the second reference signal for each of the first to third artificial neural networks. In this case, the terminal may receive the second reference signal at the transmission time of the second reference signal according to the second reference signal configuration information of each of the first to third artificial neural networks. In addition, the terminal may train at least one of the first to third artificial neural networks by using the received second reference signal.

Here, the artificial neural network, the first to third neural network encoders, and the first to third neural network decoders may be trained using the same signal and the same method as in the training of FIGS. 5 to 12.

Figure 20:
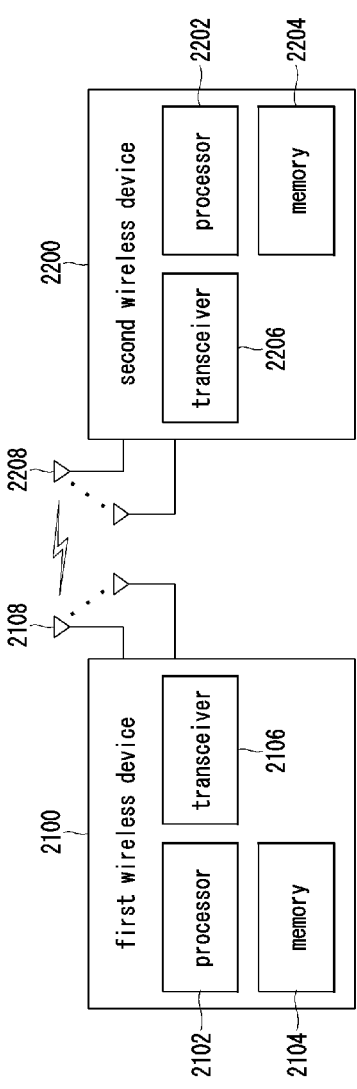
FIG. 20 is a block diagram illustrating a wireless communication device according to an exemplary embodiment of the present disclosure.

FIG. 20 is a block diagram illustrating a wireless communication device according to an exemplary embodiment of the present disclosure.

Referring to FIG. 15, a first wireless device 2100 and a second wireless device 2200 may transmit and receive a wireless signal through a variety of radio access technologies (e.g., LTE, NR). Here, the first wireless device 2100 and the second wireless device 2200 may correspond to at least part of the terminal and/or base station described with reference to FIGS. 15 to 19.

The first wireless device 2100 may include one or more processors 2102 and one or more memories 2104 and may additionally include one or more transceivers 2106 and/or one or more antennas 2108. A processor 2102 may control a memory 2104 and/or a transceiver 2106 and may be configured to implement description, functions, procedures, proposals, methods and/or operation flow charts disclosed in the present disclosure. For example, a processor 2102 may transmit a wireless signal including first information/signal through a transceiver 2106 after generating first information/signal by processing information in a memory 2104. In addition, a processor 2102 may receive a wireless signal including second information/signal through a transceiver 2106 and then store information obtained by signal processing of second information/signal in a memory 2104. A memory 2104 may be connected to a processor 2102 and may store a variety of information related to an operation of a processor 2102. For example, a memory 2104 may store a software code including commands for performing all or part of processes controlled by a processor 2102 or for performing description, functions, procedures, proposals, methods and/or operation flow charts disclosed in the present disclosure. Here, a processor 2102 and a memory 2104 may be part of a communication modem/circuit/chip designed to implement a wireless communication technology (e.g., LTE, NR). A transceiver 2106 may be connected to a processor 2102 and may transmit and/or receive a wireless signal through one or more antennas 108. A transceiver 206 may include a transmitter and/or a receiver. A transceiver 206 may be used together with a RF (Radio Frequency) unit. In the present disclosure, a wireless device may mean a communication modem/circuit/chip.

A second wireless device 2200 may include one or more processors 2202 and one or more memories 2204 and may additionally include one or more transceivers 2206 and/or one or more antennas 2208. A processor 2202 may control a memory 2204 and/or a transceiver 2206 and may be configured to implement description, functions, procedures, proposals, methods and/or operation flows charts disclosed in the present disclosure. For example, a processor 2202 may generate third information/signal by processing information in a memory 2204, and then transmit a wireless signal including third information/signal through a transceiver 2206. In addition, a processor 2202 may receive a wireless signal including fourth information/signal through a transceiver 2206, and then store information obtained by signal processing of fourth information/signal in a memory 2204. A memory 2204 may be connected to a processor 2202 and may store a variety of information related to an operation of a processor 2202. For example, a memory 2204 may store a software code including commands for performing all or part of processes controlled by a processor 2202 or for performing description, functions, procedures, proposals, methods and/or operation flow charts disclosed in the present disclosure. Here, a processor 2202 and a memory 2204 may be part of a communication modem/circuit/chip designed to implement a wireless communication technology (e.g., LTE, NR). A transceiver 2206 may be connected to a processor 202 and may transmit and/or receive a wireless signal through one or more antennas 208. A transceiver 2206 may include a transmitter and/or a receiver. A transceiver 2206 may be used together with a RF unit. In the present disclosure, a wireless device may mean a communication modem/circuit/chip.

Hereinafter, a hardware element of a wireless device 2100, 2200 will be described in more detail. It is not limited thereto, but one or more protocol layers may be implemented by one or more processors 2102, 2202. For example, one or more processors 2102, 2202 may implement one or more layers (e.g., a functional layer such as PHY, MAC, RLC, PDCP, RRC, SDAP). One or more processors 2102, 2202 may generate one or more PDUs (Protocol Data Unit) and/or one or more SDUs (Service Data Unit) according to description, functions, procedures, proposals, methods and/or operation flow charts included in the present disclosure. One or more processors 2102, 2202 may generate a message, control information, data or information according to description, functions, procedures, proposals, methods and/or operation flow charts disclosed in the present disclosure. One or more processors 2102, 2202 may generate a signal (e.g., a baseband signal) including a PDU, a SDU, a message, control information, data or information according to functions, procedures, proposals and/or methods disclosed in the present disclosure to provide it to one or more transceivers 2106, 2206. One or more processors 2102, 2202 may receive a signal (e.g., a baseband signal) from one or more transceivers 2106, 2206 and obtain a PDU, a SDU, a message, control information, data or information according to description, functions, procedures, proposals, methods and/or operation flow charts disclosed in the present disclosure.

One or more processors 2102, 2202 may be referred to as a controller, a micro controller, a microprocessor or a microcomputer. One or more processors 2102, 2202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 2102, 2202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 2102, 2202 or may be stored in one or more memories 2104, 2204 and driven by one or more processors 2102, 2202. Description, functions, procedures, proposals, methods and/or operation flow charts disclosed in the present disclosure may be implemented by using a firmware or a software in a form of a code, a command and/or a set of commands.

One or more memories 2104, 2204 may be connected to one or more processors 2102, 2202 and may store data, a signal, a message, information, a program, a code, an instruction and/or a command in various forms. One or more memories 2104, 2204 may be configured with ROM, RAM, EPROM, a flash memory, a hard drive, a register, a cash memory, a computer readable storage medium and/or their combination. One or more memories 2104, 2204 may be positioned inside and/or outside one or more processors 2102, 2202. In addition, one or more memories 104, 204 may be connected to one or more processors 2102, 2202 through a variety of technologies such as a wire or wireless connection.

One or more transceivers 2106, 2206 may transmit user data, control information, a wireless signal/channel, etc. mentioned in methods and/or operation flow charts, etc. of the present disclosure to one or more other devices. One or more transceivers 2106, 2206 may receiver user data, control information, a wireless signal/channel, etc. mentioned in description, functions, procedures, proposals, methods and/ or operation flow charts, etc. disclosed in the present disclosure from one or more other devices. For example, one or more transceivers 2106, 2206 may be connected to one or more processors 2102, 2202 and may transmit and receive a wireless signal. For example, one or more processors 2102, 2202 may control one or more transceivers 2106, 2206 to transmit user data, control information or a wireless signal to one or more other devices. In addition, one or more processors 2102, 2202 may control one or more transceivers 106, 206 to receive user data, control information or a wireless signal from one or more other devices. In addition, one or more transceivers 2106, 2206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 2106, 2206 may convert a received wireless signal/channel, etc. into a baseband signal from a RF band signal to process received user data, control information, wireless signal/ channel, etc. by using one or more processors 2102, 2202. One or more transceivers 2106, 2206 may convert user data, control information, a wireless signal/channel, etc. which are processed by using one or more processors 2102, 2202 from a baseband signal to a RF band signal. Therefore, one or more transceivers 2106, 2206 may include an (analogue) oscillator and/or a filter.

The present disclosure proposes a method and an apparatus for channel estimation and CSI feedback using artificial neural networks. The main proposals and advantages of the present disclosure may be largely as follows.

First, the present disclosure may support transmission of a reference signal according to the prior art and an augmented reference signal for artificial neural network training when an artificial neural network for cancelling interference and/or noise on a channel is configured and trained. In addition, the present disclosure may propose a method of training an artificial neural network for cancelling interference and/or noise on a channel by transmitting a reference signal for training at a transmission time previously agreed between a transmitter and a receiver.

According to the proposed method of the present disclosure, when configuring and training an artificial neural network for cancelling interference and/or noise on a channel, channel data having allocated resources with high cross-correlation therebetween can be generated as a reference signal for training, and a self-supervised learning for training a relationship between the channel data can be supported. Accordingly, according to the present disclosure, an artificial neural network for cancelling interference and/or noise on a channel even in a commercial environment where it is difficult to obtain ideal channel measurement information.

Second, in the present disclosure, when configuring and training an artificial neural network for CSI encoding and decoding, frequency-domain channel information for a virtual bandwidth may be received as an input, and time-axis channel information obtained by performing inverse Fourier transform (or IFFT) on the frequency-domain channel information may be used as an input of an internal artificial neural network. In addition, according to the present disclosure, a Fourier transform (or FFT) may be performed on an output of the internal artificial neural network to obtain the frequency-domain channel information, and an artificial neural network using the obtained frequency-domain channel information as an output may be configured.

In addition, the present disclosure may propose a method of training an artificial neural network by considering only a loss in an effective frequency region within a virtual bandwidth when training the artificial neural network. According to the proposed method of the present disclosure, the same artificial neural network can be applied to an arbitrary bandwidth smaller than the virtual bandwidth when configuring and training an artificial neural network for CSI encoding and decoding. Therefore, according to the present disclosure, the same artificial neural network can be used in a system in which the actual operating bandwidth is variable, thereby minimizing the cost of using artificial neural networks.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The claims set forth herein can be combined in a variety of ways. For example, the technical features of the method claims of the present disclosure may be combined to be implemented as an apparatus, and the technical features of the apparatus claims of the present disclosure may be combined to be implemented as a method. In addition, the technical features of the method claims of the present disclosure and the technical features of the apparatus claims of the present disclosure may be combined to be implemented as an apparatus, and the technical features of the method claims of the present disclosure and the technical features of the apparatus claims of the present disclosure may be combined to be implemented as a method.

Although it has been described with reference to the preferred exemplary embodiments of the present disclosure, it should be understood that those skilled in the art can variously modify and change the present disclosure within the scope not departing from the spirit and scope of the present disclosure described in the claims below.

What is claimed is:

1. A method of a terminal, comprising:
- receiving, from a base station, first signal configuration information including information on a plurality of transmission resource candidates for transmitting a first signal indicated for training;
- transmitting, to the base station, a first message requesting transmission of the first signal, wherein the first message indicates first transmission resource information of the plurality of transmission resource candidates;
- receiving, from the base station, the first signal through the first transmission resource information;
- training an artificial neural network model based on the first signal; and
- transmitting, to the base station, a training completion report message to request a stop of transmission of the first signal.

2. The method according to claim 1, further comprising: before the receiving of the first signal configuration information,
- generating capability information including at least one of information indicating whether the terminal is capable of training the artificial neural network model using the first signal, information indicating whether the terminal uses the first signal, information indicating whether the terminal needs the first signal, information on a transmission periodicity of the first signal, or information on a transmission resource of the first signal; and
- transmitting the capability information to the base station, wherein the transmission resource information is configured based on the capability information.

3. The method according to claim 1, wherein the first signal configuration candidates for transmitting the first signal is received through a higher layer signal or a dynamic control signal of the base station.

4. The method according to claim 1, wherein the first signal is transmitted with a resource in which a time or frequency domain resource density is increased N times with respect to a second signal, N is a positive integer greater than or equal to 2, and the second signal is a demodulation reference signal (DMRS) or channel state information-reference signal (CSI-RS).

5. The method according to claim 1, wherein the training of the artificial neural network model comprises:
- dividing a plurality of transmission resources according to the transmission resource information into a first subset and a second subset, which are distinguishable from each other;
- configuring channel information estimated using a part of the first signal received through transmission resources of the first subset as first channel information;
- configuring channel information estimated using another part of the first signal received through transmission resources of the second subset as second channel information; and
- training the artificial neural network model using the first channel information as an input and the second channel information as a target.

6. The method according to claim 1, wherein the training of the artificial neural network model comprises:
- configuring a subset from a whole of the plurality of transmission resources according to the transmission resource candidates;
- receiving the first signal through the whole of the plurality of the transmission resource candidates;
- estimating channel information for the whole of the plurality of the transmission resources based on the first signal;
- substituting channel information corresponding to one or more transmission resources belonging to the subset among the channel information for the whole of the plurality of the entire transmission resources with an arbitrary value;
- configuring channel information including the substituted arbitrary value as first channel information;
- configuring second channel information by masking channel information for one or more remaining transmission resources not belonging to the subset from the channel information for the whole of the plurality of the transmission resources; and
- training the artificial neural network model using the first channel information as an input and the second channel information as a target.

7. The method according to claim 1, wherein in the training of the artificial neural network model, the terminal uses at least one of channel estimation type information, information on a variance of a noise level, reception sensitivity information, or frequency resource information as additional information to train the artificial neural network model.

8. The method according to claim 1, further comprising:
- receiving a second signal from the base station;
- generating channel information from the second signal using the artificial neural network model trained based on the first signal; and
- transmitting the channel information to the base station.

9. A method of a base station, comprising:
- generating first signal configuration information including information on a plurality of transmission resource candidates for transmitting a first signal indicated for training;
- transmitting the first signal configuration information to the terminal;
- receiving, from the terminal, a first message requesting transmission of the first signal, wherein the first message indicates first transmission resource information of the plurality of transmission resource candidates;
- transmitting, to the terminal, the first signal to through the first transmission resource information; and
- receiving, from the terminal, a training completion report message to request a stop of transmission of the first signal.

10. The method according to claim 9, further comprising: receiving, from the terminal, capability information including at least one of information indicating whether the terminal is capable of training an artificial neural network model using the first signal, information indicating whether the terminal uses the first signal, information indicating whether the terminal needs the first signal, information on a transmission periodicity of the first signal, or information on a transmission resource of the first signal, wherein the base station configures the transmission resource information based on the capability information.

11. The method according to claim 9, further comprising:

transmitting a second signal to the terminal; and receiving channel information from the terminal, the channel information being generated from the second signal using an artificial neural network model trained based on the first signal.

\* \* \* \* \*